US006817787B2

(12) United States Patent
Toyoda

(10) Patent No.: US 6,817,787 B2
(45) Date of Patent: Nov. 16, 2004

(54) SHUTTER APPARATUS AND CAMERA

(75) Inventor: Yasuhiro Toyoda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 10/167,515

(22) Filed: Jun. 12, 2002

(65) Prior Publication Data

US 2002/0197078 A1 Dec. 26, 2002

(30) Foreign Application Priority Data

Jun. 20, 2001 (JP) ........................................ 2001-186247

(51) Int. Cl.[7] .............................................. G03B 9/40
(52) U.S. Cl. ..................................... 396/487; 396/488
(58) Field of Search .............................. 396/484, 486, 396/487, 488, 490, 491, 492

(56) References Cited

U.S. PATENT DOCUMENTS 4,657,366 A * 4/1987 Tanabe et al. .............. 396/456

* cited by examiner

Primary Examiner—David M. Gray
(74) Attorney, Agent, or Firm—Robin, Blecker & Daley

(57) ABSTRACT

The present invention discloses a shutter apparatus including a base plate, a plurality of blades which run between a superposed state and a spread state for opening and closing a shutter aperture and two arms, each of the arms pivotably supported on the base plate. It is characterized in that each of the two arms are pivotably connected to the plurality of blades, and the two arms cause the plurality of blades to run between the superposed state and the spread state, and a protruding section is formed in a central area of at least one of the plurality of the blades, and the protruding section protrudes in the blade running direction so as to overlap with the base plate in the spread state.

24 Claims, 24 Drawing Sheets

SHUTTER APPARATUS AND CAMERA

BACKGROUND OF THE INVENTION

1. Field of the Invention

The present invention relates to a separated-blade type shutter apparatus.

2. Description of the Related Art

There are two types of a conventional focal plane shutter which includes a parallel link mechanism made up of two arms to support group of a plurality of divided blades pivotably, constructed in such a way that pivoting of these arms causes the blade group to run between a superposed state and a spread state; a long-arm type and short-arm type depending on the different methods of holding the blade group by the arms.

Here, a so-called longitudinally moving focal plane shutter that moves the blade group up and down will be explained.

First, as disclosed in Japanese Utility Model Publication No. 35-29651, a long-arm type shutter apparatus includes blade group supported by the arms pivotably at locations on the opposite side of the arm base ends across the shutter aperture. Thus, the arms are longer than the width of the shutter aperture.

Such a long-arm type shutter apparatus needs only a small arm turning angle for opening/closing the shutter aperture by the blade group, reducing the amount of displacement of the blade group by the opening/closing operation in the direction orthogonal to the blade running direction, which is advantageous to a reduction of the horizontal width of the shutter.

However, increasing the number of blades of the blade group that can be supported by the two arms to 3 or more has a disadvantage of complicating the structure and a disadvantage in a high-speed movement because of the use of a long arm, which increases inertia of the blade unit.

For this reason, with the enhancement of the shutter exposure speed and strobe tuning speed in recent years, a long-arm type shutter apparatus unfit for speed enhancement is falling into disuse.

On the other hand, a short-arm type shutter apparatus proposed to cover the disadvantages of the long-arm type is constructed in such a way that a group of a number of blades are supported by two arms on the shutter aperture edge side near the base ends of the arms pivotably without sandwiching the shutter aperture, though it is disadvantageous to reducing the horizontal width.

Moreover, the lengths of the arms are often reduced to a minimum to further reduce inertia.

Examples of this short arm type are shown in FIG. 23 and FIG. 24. FIG. 23 shows a shutter apparatus ready to run and FIG. 24 shows the shutter apparatus, which has completed a running.

In these figures, reference numeral 101 denotes a board (shutter base plate) having a shutter aperture 101a. This base plate 101 supports base ends of a front shutter first arm 106 and a front shutter second arm 107 pivotably by axes 101d and 101e.

The front shutter has a five-blade configuration and is constructed of a slit-forming blade 102 formed to open or close the shutter aperture and covering blades 103, 104, 105 and 105'. The slit-forming blade 102 and covering blades 103–105, 105' are connected to the arms 106 and 107 pivotably by means of blade swaging dowel pins 108a, 108b, 108c, 108d, 108e, 109a, 109b, 109c, 109d and 109e, thus forming a parallel link.

Furthermore, this base plate 101 supports the base ends of a rear shutter first arm 114 and a rear shutter second arm 115 pivotably by axes 101f and 101g. The rear shutter has a four-blade configuration and is constructed of a slit-forming blade 110 formed to open or close the shutter aperture and covering blades 111, 112 and 113. The slit-forming blade 110 and covering blades 111–113 are connected to the arms 114 and 115 pivotably by means of blade swaging dowel pins 116a, 116b, 116c, 116d, 117a, 117b, 117c and 117d, thus forming a parallel link.

The swaging dowel pins of both the front shutter and rear shutter are positioned in sequence so as to draw a gentle arc and when the blade unit is in a superposed state to open the shutter aperture, the first arm and second arm are designed to align close to each other.

Furthermore, the external size of the blades for the front shutter necessary to secure an amount of overlapping among the adjacent blades for shielding when the blades are spread (here, equally 4 mm) and necessary to shield the shutter aperture is a little larger than the shutter aperture (here, approximately 2 mm in the vertical direction of the aperture and approximately 6.6 mm at the ends of the blades) considering an unnecessary increase of the blade inertia, (hereinafter, this shutter apparatus will be referred to as "first conventional example").

Furthermore, Japanese Utility Model Publication No. 53-39472 discloses a shutter apparatus in a configuration that the slit-forming blade is supported by a parallel link of relatively long type arms and opening/closing of the other covering blades is driven by actions of action pins and cum grooves.

In order to form the cum grooves for drive, the covering blades are shaped in such a way that the part near the blade root protrudes toward a position away from the shutter aperture when the blades for shielding the shutter aperture are spread, (hereinafter, this shutter apparatus will be referred to as "second conventional example").

Furthermore, according to the shutter apparatus disclosed in Japanese Patent Publication No. 60-3165 (hereinafter, referred to as "third conventional example") and the shutter apparatus disclosed in Japanese Utility Model Publication No. 7-25787 (hereinafter, referred to as "fourth conventional example"), a protruding shape is formed near the root close to the coupling with the arm of the covering blade with the shortest running distance.

Furthermore, according to the shutter apparatus proposed in Japanese Patent Laid-Open No. 2000-180916 specification (hereinafter, referred to as "fifth conventional example"), a shielding mechanism is provided between an image-taking lens and focal plane shutter and this shielding mechanism is provided so as to freely move between an open position at which the exposure aperture is exposed by superposing the upper two of the four shields above the exposure aperture and a shielded position at which the exposure aperture is shielded by spreading the shields so as to shield the generally upper half of the exposure aperture.

Moreover, the rest of the shields are provided so as to freely move between an open position at which the exposure aperture is opened by superposing the shields below the exposure aperture and a shielded position at which the exposure aperture is shielded by spreading the shields so as to shield the generally lower half of the exposure aperture.

When the user opens the back cover of the camera, the exposure aperture is doubly covered with both the blades of the focal plane shutter and the shield of the shielding section in that order from the back side (user side). The shields, which move a smaller distance, are provided with a protruding section to be connected using an arm and pin respectively so as to be located outside the exposure aperture in a shielded state.

With a camera incorporating the above-described focal plane shutter, there is a possibility that the user may touch the blades when opening the back cover and loading a film. In the case where the user touches the blades a little stronger, the blades may penetrate the shutter aperture causing the inconvenience of disabling the camera from taking images.

For example, in the above-described first conventional example, when the back cover of the camera is opened, since the front shutter covering the shutter aperture gives priority to the alleviation of inertia while maintaining the shielding performance, the front shutter does not have a shape strong enough to hold on when pressed by a finger, etc. from the back cover and may easily penetrate the shutter aperture.

Furthermore, when generally attempting to reduce the size of the shutter, reduce the horizontal width in particular, reducing the number of the divided blades of the blade group can reduce the number of connections between the arms and blades and thereby reduce the area occupied by the connected parts, which is advantageous to a reduction of the horizontal width.

However, reducing the number of blades of the blade group also reduces the amount of overlap among the blades to shield the shutter aperture of a predetermined size, making it difficult to secure the shielding performance.

Furthermore, since it is not possible to reduce the width per one blade so much, reducing the number of blades is disadvantageous to a reduction of the size in the height direction when the shutter top end located above the shutter aperture is brought closer to the shutter aperture.

In the above-described first conventional example, when the arms are shortened for miniaturization, since there are as many as five front-shutter blades, distances among the blades are reduced with the blade swaging dowel pins remaining arranged as they are, which reduces the degree of freedom of the support positions at which the covering blades can freely turn, and thereby causes interference inside the blade unit (for example, in FIG. 24, interference between the circumference of the base end 106b of the first arm 106 and the second arm 107 peripheral to the blade swaging dowel pin 109e or the circumference of the covering blade 105' or interference between the circumference of the first arm 106 peripheral to the blade swaging dowel pin 108e and the second arm 107 peripheral to the blade swaging dowel pins 109c and 109d and the circumference of the covering blades 104 and 105, etc.).

For this reason, it is not possible to increase the arm rotation operating angle (since the size of the shutter aperture in the blade running direction is fixed, if the arm of a parallel link is shortened, it is necessary to increase the arm rotation operating angle to move the blade a predetermined distance) and it is also difficult to maintain the amount of overlapping between the slit-forming blade and the covering blades when the blades for closing the shutter aperture are spread, which makes it impossible to achieve significant miniaturization.

On the contrary, when the rear shutter in a four-blade configuration is also used for the front shutter commonly, the amount of overlapping among the blades when the rear shutter is spread is as small as approximately 2 as shown in FIG. 24. And even if the width of each blade is widened within the allowable blade housing space in the superposed state in which the front shutter opens the shutter aperture, distances among the blades are reduced with the blade swaging dowel pins remaining arranged as they are just like the above-described 5-blade configuration, which reduces the degree of freedom of the support positions at which the covering blades can freely turn because of the restrictions on the positions of the blade swaging dowel pins, and thereby causes interference inside the blade unit (for example, in FIG. 23, interference between the circumference of the base end 114b of the first arm 114 and the second arm 115 peripheral to the blade swaging dowel pin 117d or the circumference of the covering blade 113 or interference between the circumference of the first arm 114 peripheral to the blade swaging dowel pin 116d and the second arm 115 peripheral to the blade swaging dowel pin 117c and the circumference of the covering blade 112, etc.).

For this reason, it is only possible to widen by 1 mm in the opposite direction of the blade running direction, not possible to secure the amount of blade overlapping of desired 4 mm and nor possible to reduce the size so much (for an explanation of locations of the blade swaging dowel pins, see "f." which will be described later).

Moreover, in the above-described second conventional example (Japanese Utility Model Publication No. 53-39472), since the blade drive arm is long, if the arm happens to be pushed when the shutter blade is pressed by a finger, etc. from the back cover side, not only this arm can hold on but also the protruding shape near the root of the cum groove forming blade of the covering blade can hold on a little more.

However, even in the vicinity of the center of the shutter aperture, if the arm is not pushed but the covering blade is directly pushed, the blade end side cannot hold on, and therefore the end of covering blade easily penetrates the shutter aperture.

In addition, the configuration that opening/closing of the parallel link of the relatively long type arms and the covering blades is controlled by actions of the action pins and cum grooves has a more complicated structure than a general parallel link mechanism with two arms as in the case of the first conventional example, also increases operating resistance and increases inertia of the blade unit.

Thus, the above-described second conventional example is disadvantageous for high-speed movement and can hardly realize an exposure time shorter than, 1/4000 sec or strobe tuning time shorter than 1/200 sec with a camera, for example.

Furthermore, the shutter charge energy necessary to realize the same shutter speed increases and thereby causes the size of the camera to increase, which is inconvenient for increasing a frame speed during continual picture taking.

Furthermore, in the above-described third conventional example (Japanese Patent Publication No. 60-3165) and fourth conventional example (Japanese Utility Model Publication No. 7-25787), the holding-on of the root of the blade slightly increases when the shutter blade is pushed by a finger, etc. from the back cover side (the blade root side can sufficiently hold on because high rigidity arms are originally provided on the blade root side), whereas the blade end side cannot still hold on sufficiently, and therefore the end of the covering blade can easily penetrate the shutter aperture.

Furthermore, in the above-described fifth conventional example (Japanese Patent Laid-Open No. 2000-180916), when the holding-on against a pressure is considered from the standpoint of the shape of the shield, if the shield is pushed by a finger, etc. from the back cover side when the exposure aperture is closed, since the shield root side is provided with high rigidity arms and these arms overlap with the protruding section of the shield, and therefore the holding-on against the pressure of the shield hardly changes irrespective of whether this protruding section is present or not, the shield root side can originally hold on in its own way.

However, since the shield end side cannot still hold on, the end of the shield easily penetrates the exposure aperture. That is, the protruding section of the shield is formed simply for the pin connection with the arms of the shield after all.

SUMMARY OF THE INVENTION

It is an object of the present invention to provide a shutter apparatus capable of increasing resistance to penetration by the blades while reducing an increase of inertia of the blade unit.

Furthermore, it is another object of the present invention to provide a shutter apparatus having a small size in the direction orthogonal to the blade running direction, capable of securing a sufficient amount of overlapping for blades, with high operating efficiency and suitable for high-speed operation.

In order to attain the above-described objects, the shutter apparatus of the present invention includes:

a base plate having a shutter aperture formed therein;

a plurality of blades which run between a superposed state and a spread state for opening and closing the above-described shutter aperture; and two arms, each of the arms pivotably supported on the base plate and each of the two arms pivotably connected to the plurality of blades. The two arms cause the plurality of blades to run between the superposed state and the spread state, and a protruding section is formed in a central area of at least one of the plurality of blades.

The protruding section protrudes in the blade running direction so as to overlap with the base plate in the spread state.

Furthermore, the shutter apparatus of the present invention includes:

a base plate having a shutter aperture formed therein;

a plurality of blades which run between a superposed state and a spread state for opening and closing the shutter aperture; and two arms, each of the arms pivotably supported on the base plate, and each of the two arms pivotably connected to the plurality of blades. The two arms cause the plurality of blades to run between the superposed state and the spread, and a protruding section—is formed in a central area of the blade which runs the shortest distance between the superposed state and the spread state out of the plurality of blades.

The protruding section protrudes in the blade running direction so as to overlap with the base plate in the spread state.

In the case where the shutter apparatus of the present invention includes a plurality of front shutter blades running from the spread state to the superposed state and a plurality of rear shutter blades running from the superposed state to the spread state after the front shutter blades start to run. The protruding section can be formed on the front shutter blade located closest to the end side in the blade running direction in the spread state or on the front shutter blade which runs the shortest distance between the superposed state and the spread state out of the plurality of front shutter blades.

Furthermore, the present invention are applicable to a so-called short arm type shutter apparatus wherein the arms are connected to the vicinity of the ends, on the base end side of the arms, of the blades.

Furthermore, a plurality of the protruding sections can also be formed on at least one of the plurality of the blades.

Then, the shutter apparatus of the present invention can be used for image-taking system of a camera and for shielding external light when writing images of an image display apparatus using storing/displaying device represented by a spatial light modulation element.

A detailed configuration of the shutter apparatus, of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
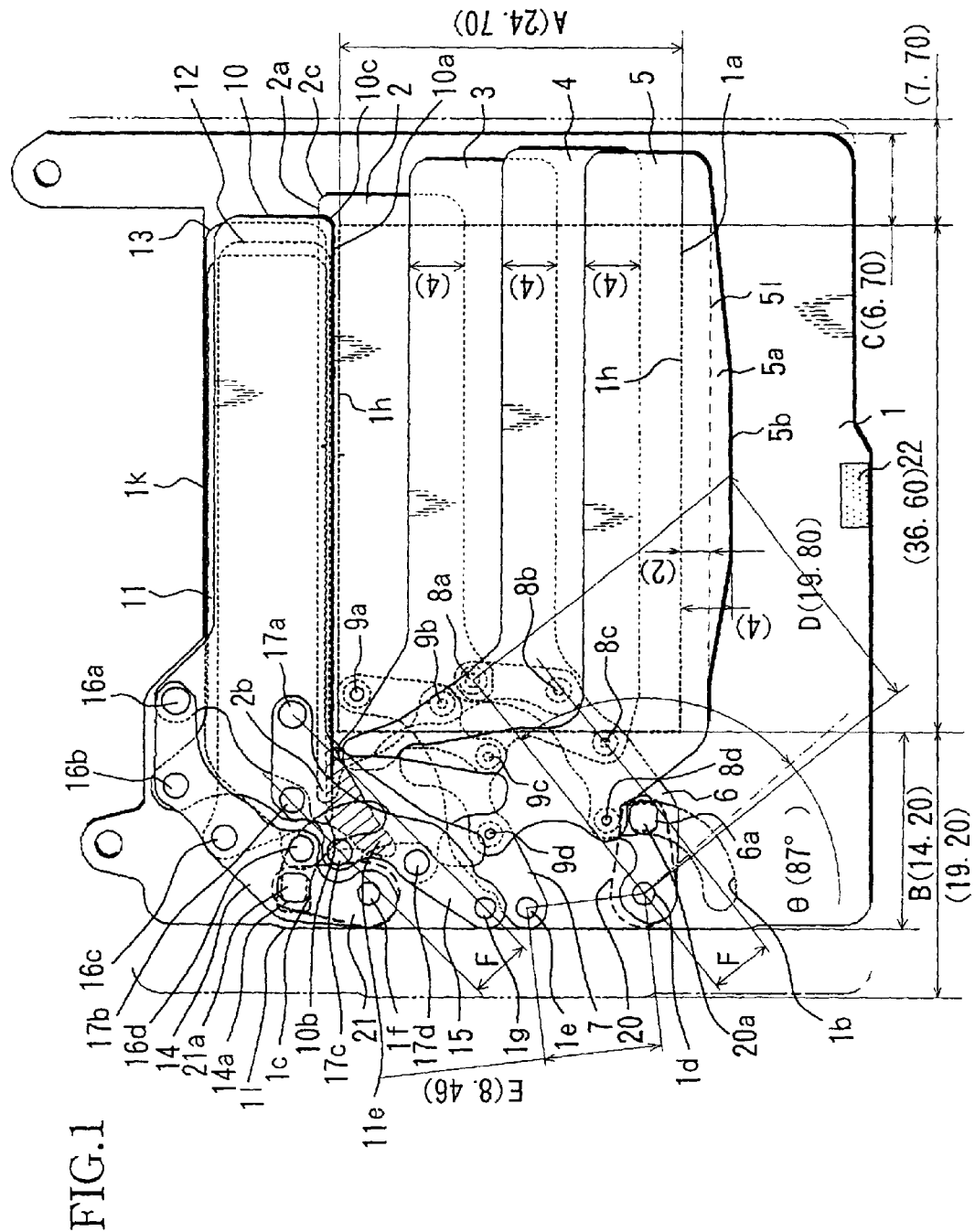
FIG. 1 is a front view showing a focal plane shutter apparatus (when ready to run), which is an embodiment of the present invention.
Figure 2:
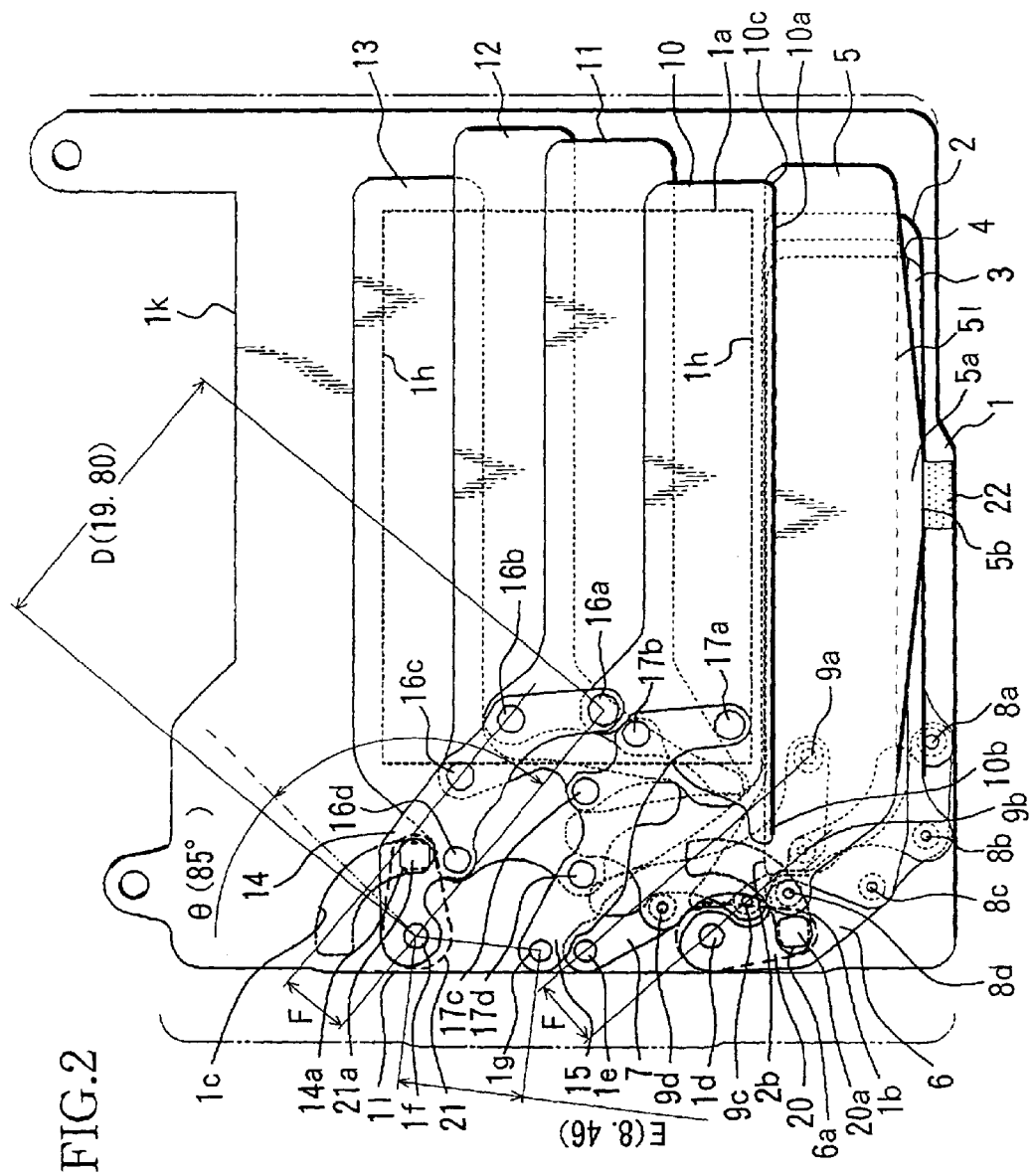
FIG. 2 is a front view showing the focal plane shutter apparatus (when running is completed)
Figure 3:
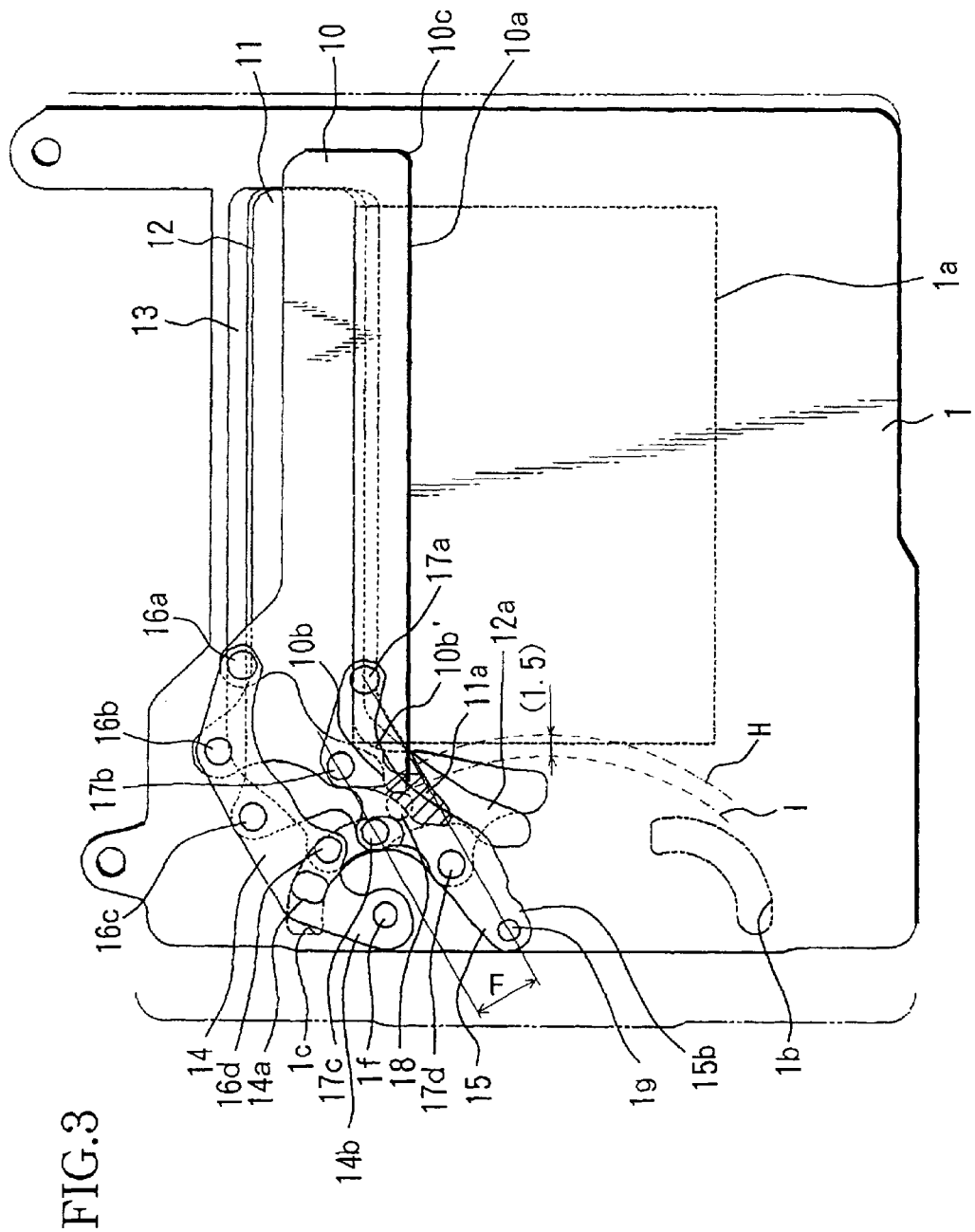
FIG. 3 is a front view showing rear shutter of the focal plane shutter apparatus (when ready to run)
Figure 4:
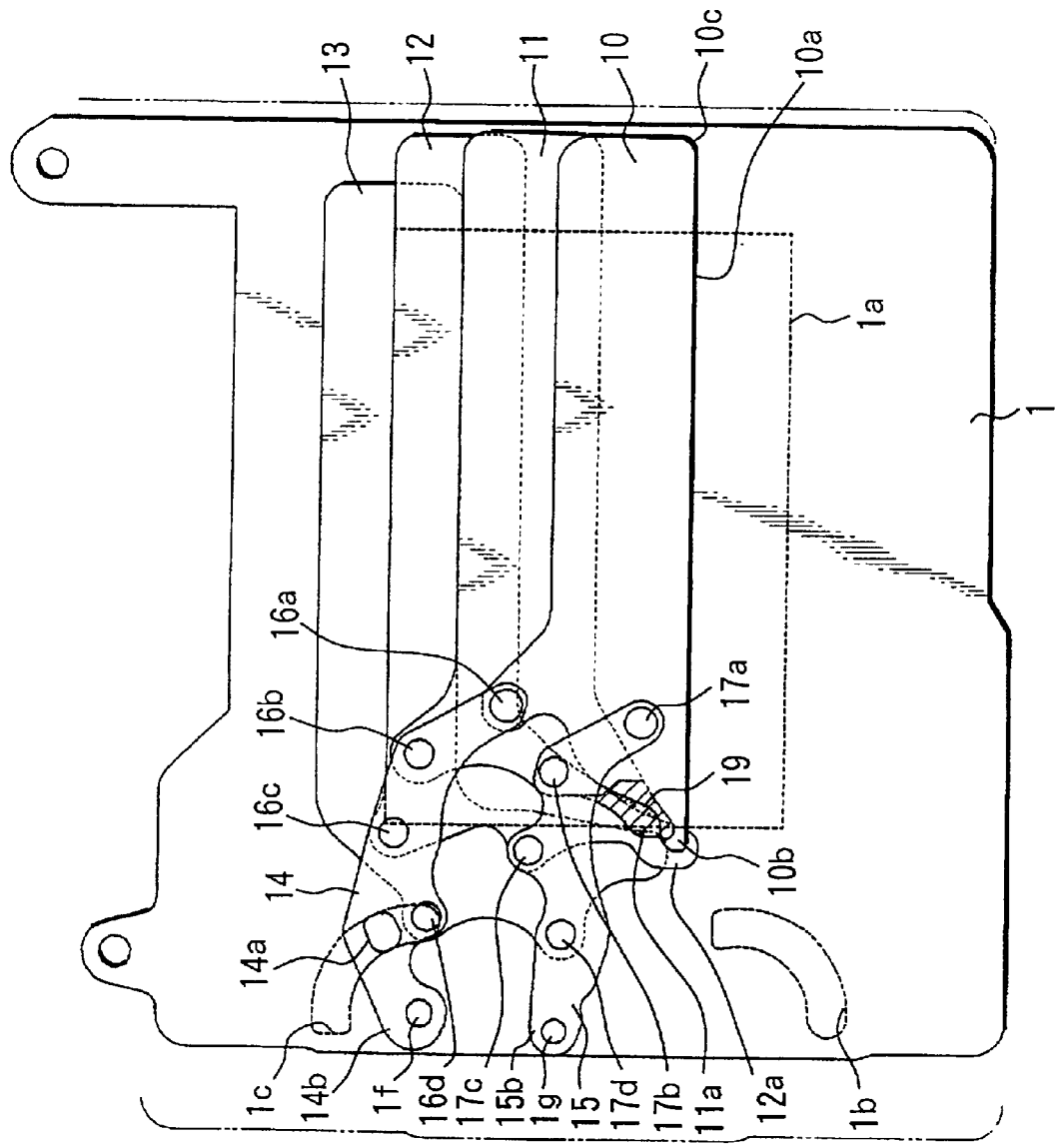
FIG. 4 is a front view showing the rear shutter of the focal plane shutter apparatus (when running is completed)
Figure 10:
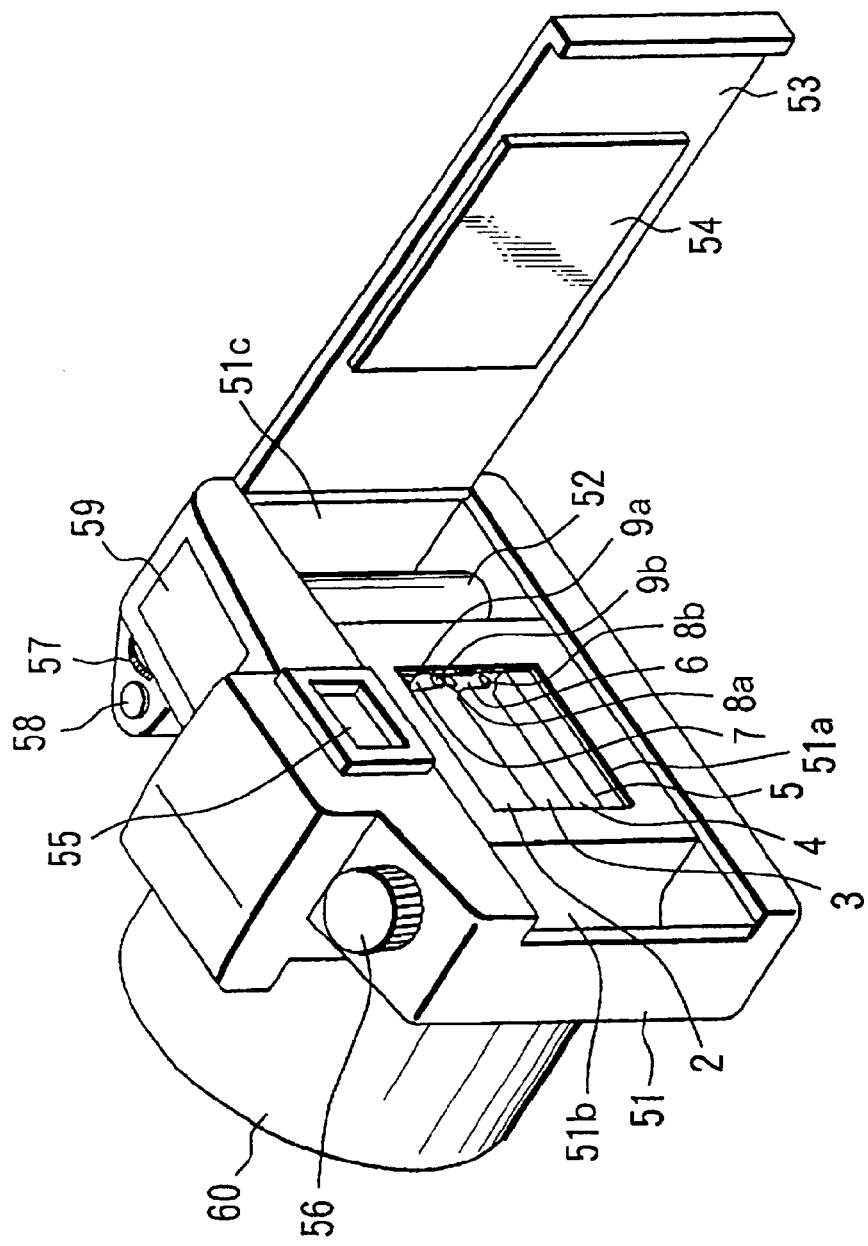
FIG. 10 is a perspective view showing a single-lens reflex camera incorporating the focal plane shutter apparatus when the back cover of the camera is opened.
Figure 11:
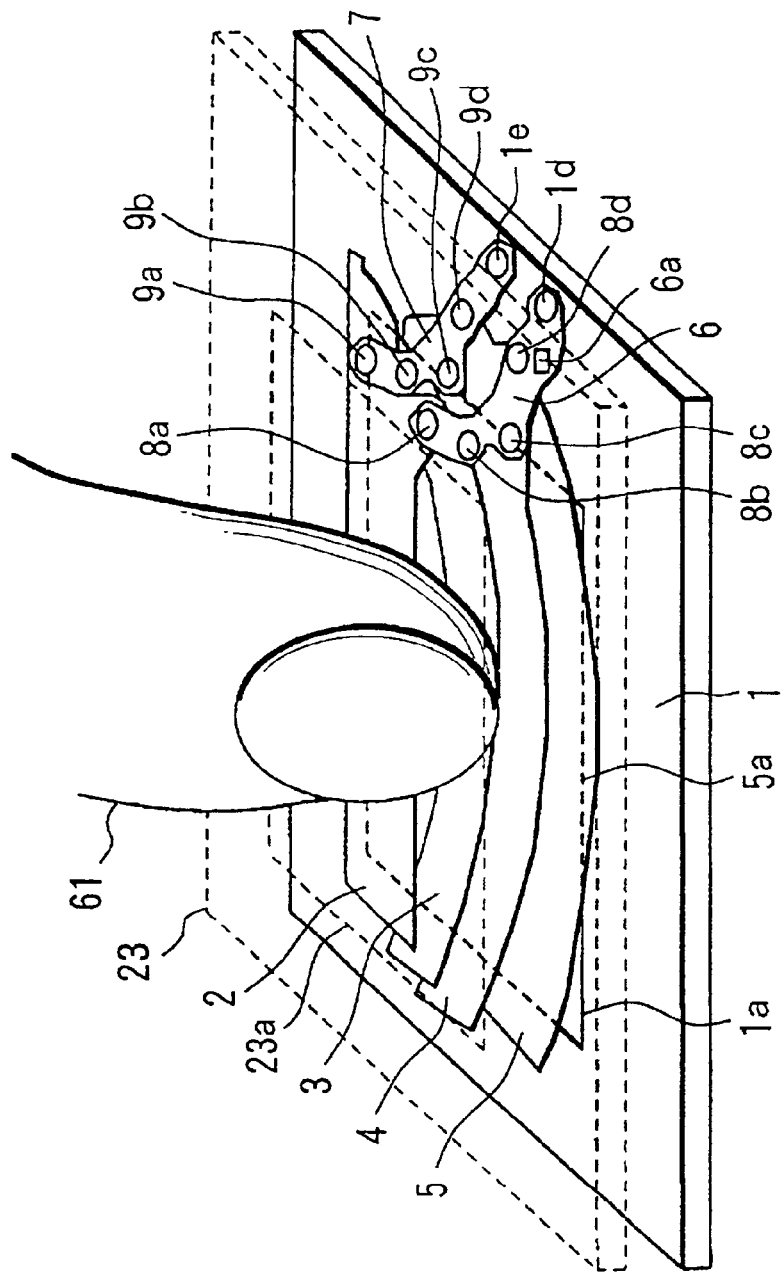
FIG. 11 illustrates the focal plane shutter apparatus when the blade group is pushed by a finger from the back cover side.

FIG. 1 to FIG. 4 show a configuration of a focal plane shutter apparatus, which is an embodiment of the present invention. FIG. 1 shows the focal plane shutter apparatus when ready to run of blades, FIG. 2 shows the focal plane shutter apparatus when running of blades is completed. FIG. 3 and FIG. 4 illustrate effects obtained by devising the positions of arm-blade connections. Furthermore, FIG. 10 shows the shutter apparatus incorporated in a single-lens reflex camera viewed when the back cover of the camera is opened. FIG. 11 illustrates the shutter apparatus when the blade group is pushed by a finger from the back cover side.

In FIG. 1 to FIG. 4, reference numeral 1 denotes a board having a shutter aperture 1a (hereinafter referred to as "shutter base plate") and 1b denotes a long hole part to escape from a moving area of a drive pin 20a of a front shutter drive lever 20. The front shutter drive lever 20 is a lever that gives moving energy to the front shutter by means of a spring force, etc. and the drive pin 20a is the part engaged with a front shutter arm which will be described later.

Reference numeral 1c denotes a long hole part to escape from a moving area of guide a drive pin 21a of a rear shutter drive lever 21. The rear shutter drive lever 21 is a lever that gives moving energy to the rear shutter by means of a spring force, etc. and the drive pin 21a is the part engaged with a rear shutter arm which will be described later.

Reference numeral 2 denotes a front shutter slit-forming blade (#1 blade); 2a, a front shutter slit-forming section of the #1 blade; 2b, an end on the arm base end side of the front shutter slit-forming section 2a.

Reference numerals 3 to 5 denote front shutter covering blades and 3 is referred to as a #2 front blade; 4, a #3 front blade; 5, a #4 front blade.

Here, reference numeral 5a denotes a protruding section provided at the bottom of the substantially center in the blade longitudinal direction (direction orthogonal to the blade running direction) of the #4 front blade 5 and protrudes so as to overlap the part below (outside) the bottom of the shutter aperture 1a of the shutter base plate 1 when the front shutter is spread as shown in FIG. 1. This protruding section 5a is formed in such a way that the amount of protrusion is largest near the substantially center in the blade longitudinal direction of the #4 front blade 5 and decreases toward both ends.

If the only function of the #4 front blade 5 is to shield light, a rectilinear shape along the bottom of the shutter aperture 1a as shown by two-dot dashed line 51 in FIG. 1 and FIG. 2 is sufficient. However, this embodiment forms the protruding section 5a protrudes below the above-described two-dot dashed line 51, as will be described later, so as to increase resistance to a penetrating force on the shutter aperture 1a of the front shutter blade group when an external force is applied thereto from the opposite side of the shutter base plate 1 when the front shutter blade group is spread.

Of the #4 front blade 5, reference numeral 5b denotes an end of the #4 front blade 5 that contacts a front shutter stopper rubber 22 when a movement (running) of the front shutter is completed.

Reference numeral 6 denotes a front shutter first arm and a base end 6b thereof is attached so as to be pivotable around an axis 1d provided on the shutter base plate 1. At the end of the front shutter first arm 6, a front shutter slit-forming blade 2 is connected pivotably by means of a swaging dowel pin 8a. Reference numeral 6a is a hole part of the front shutter first arm, that allows the drive pin 20a of the front shutter drive lever 20 to penetrate without backlash in the drive direction and the power from the front shutter drive lever 20 whose rotational axis is concentric with the axis 1d is transmitted to the front shutter first arm 6 through this hole part 6a.

Reference numeral 7 denotes a front shutter second arm and a base end 7b thereof is attached so as to be pivotable around an axis 1e provided on the shutter base plate 1. At the end of the front shutter second arm 7, a front shutter slit-forming blade 2 is connected pivotably by means of a swaging dowel pin 9a.

In this way, the front shutter slit-forming blade 2 and front shutter first and second arms 6 and 7 form a parallel link.

Likewise, of the front shutter covering blades, the #2 blade 3, #3 blade 4 and #4 blade 5 are connected in an intermediate area between the front shutter first arm 6 and second arm 7 pivotably by means of their respective swaging dowels 8b, 9b, 8c, 9c, 8d and 9d, forming parallel links.

The front shutter drive lever 20 rotates using the axis on the extension of the axis 1d as a rotational axis. Furthermore, the turning radius of the drive pin 20a around the axis 1d is set to be smaller than the turning radius of the #4 blade swaging dowel pin 8d located innermost on the front shutter first arm 6. The front shutter is constructed in this way.

Reference numeral 22 denotes a front shutter stopper rubber working as a buffer to stop the front shutter that runs at high speed when running of the front shutter is completed, speedily and without shock.

When the shutter apparatus is ready to run as shown in FIG. 1, an end 2b of the arm base end side on the slit-forming section 2a of the front shutter slit-forming blade 2 is located outside the area in which the drive pin 21a operates so as not to interfere with the drive pin 21a of the rear shutter drive lever 21.

Furthermore, in a running completed state as shown in FIG. 2, the end 2b of the arm base end side on the slit-forming section 2a of the front shutter slit-forming blade 2 is located inside the area in which the drive pin 20a operates.

The rear shutter is constructed in the same way as the front shutter. Reference numeral 10 denotes a rear shutter slit-forming blade; 10a, a rear shutter slit-forming section of the blade 10; 10b, an end of the arm base end side of the rear shutter slit-forming section 10a.

Reference numerals 11 to 13 denote rear shutter covering blades and 11 is referred to as #2 rear blade; 12, #3 rear blade; 13, #4 rear blade.

Reference numeral 14 denotes a rear shutter first arm and a base end 14b thereof is attached so as to be pivotable around an axis 1f provided on the shutter base plate 1. At the end of the rear shutter first arm 14, the rear shutter slit-forming blade 10 is connected pivotably by means of a swaging dowel pin 16a.

Reference numeral 14a is a hole part of the rear shutter first arm which allows the drive pin 21a of the rear shutter drive lever 21 to penetrate without backlash in the drive direction and the power from the rear shutter drive lever 21 whose rotational axis is provided concentric with the axis 1f is transmitted to the rear shutter first arm 14 through this hole part 14a.

Reference numeral 15 denotes a rear shutter second arm and a base end 15b thereof is attached so as to be pivotable around an axis 1g provided on the shutter base plate 1. At the end of the rear shutter second arm 15, the rear shutter slit-forming blade 10 is connected pivotably by means of a swaging dowel pin 17a.

In this way, the rear shutter slit-forming blade 10 and rear shutter first and second arms 14 and 15 form a parallel link.

Likewise, of the rear shutter covering blades, the #2 blade 11, #3 blade 12 and #4 blade 13 are connected in an intermediate area between the first arm 14 and second arm 15 pivotably by means of their respective swaging dowels 16b and 17b, 16c and 17c and 16d and 17d, forming parallel links.

The rear shutter drive lever 21 rotates using the axis on the extension of the axis 1f as a rotational axis. Furthermore, the turning radius of the drive pin 21a around the axis 1f is set to be smaller than the turning radius of the #4 blade swaging dowel pin 16d located innermost on the rear shutter first arm 14. The rear shutter is constructed in this way.

In a running ready state in FIG. 1, the end 10b on the arm base end side of the slit-forming section 10a of the rear shutter slit-forming blade 10 is located inside the area in which the drive pin 21a operates. Furthermore, in a running completed state in FIG. 2, the end 10b on the arm base end side of the slit-forming section 10a of the rear shutter slit-forming blade 10 is located outside the area in which the drive pin 20a operates so as not to interfere with the drive pin 20a of the front shutter drive lever.

The lengths of the arms 6, 7, 14, 15 of these front shutter and rear shutter are reduced for miniaturization, but since the size of the shutter aperture 1a in the blade running direction is fixed, if the length of the arms are reduced in the parallel link, the rotation operating angle of the arms must be increased to move the blades by a predetermined distance.

As mentioned above, when an attempt is made to increase the rotational angle of the arms in the superposed state of the blade unit in the four-blade configuration, the rotational angle of the arms cannot be increased when the blade swaging dowel pins 117b, 117c and 117d on the second arm 115 are placed so as to contact the base end and the blade swaging dowel pins on the first arm as in the case of the first conventional example, making it difficult to reduce the size of the shutter.

Therefore, to increase the rotational angle of the arms, it is effective, as shown in FIG. 1 and FIG. 2, to prevent the blade swaging dowel pins 9b, 9c, 9d and 17b, 17c and 17d on the second arms 7 and 15 from contacting the base ends 6b and 14b on the first arms 6 and 14 and blade swaging dowel pins 8d and 16d and place them in an alternated configuration.

Furthermore, the effect of miniaturization will be greater if the swaging dowel pins 8c, 9c, 8d, 9d and 16c, 17c, 16d and 17d of at least two blades (#3 blade, #4 blade) 4 and 5 and 12 and 13 placed close to the arm base end come closer to the end 1l in the horizontal direction of the outline of the shutter base plate 1 as much as possible and can be placed along the end 1l in the horizontal direction.

As a specific example, in the case of the rear shutter of the first conventional example, since the rotational angle of the arms 114, 115 cannot be increased, the blade swaging dowel pins 116c, 117c, 116d and 117d placed near the arm base end cannot come closer to the end 101l of the outline of the shutter base plate 101 in the horizontal direction when the blades 102–105 are in the superposed state and cannot be placed along the end 101l in the horizontal direction, the distance in the horizontal direction between the blade swaging dowel pins is as large as 3.08 mm, thus increasing the size (horizontal size) in the direction orthogonal to the shutter blade running direction. From this, it is easily estimated that even if an attempt is made to reduce the size following the positional relationship of the blade swaging dowel pins, etc. as in the case of the first conventional example, the size cannot be reduced so much.

On the other hand, according to this embodiment, since the rotational angle of the arm can be increased a great deal for both the front shutter and rear shutter with an arrangement that the blade swaging dowel pins are placed in an alternated configuration, the swaging dowel pins 8c, 9c, 8d, 9d and 16c, 17c, 16d and 17d of the two blades (#3 blade, #4 blade) 4, 5 and 12, 13 placed near the arm base end when the blades are in a superposed state can come closer to the end 1l of the outline of the shutter base plate 1 in the horizontal direction and can be placed along the end 1l in the horizontal direction, if it is assumed that the distance in the horizontal direction between the blade swaging dowel pins 8c and 8d (and 9c, 9d) of the front shutter is 0.44 mm, and the distance in the horizontal direction between the blade swaging dowel pins 16c and 16d (and 17c, 17d) of the rear shutter is 0.77 mm, and the angle corresponding to the overcharge is a maximum of 4°, these distances in the horizontal direction when both the front shutter and rear shutter are in the superposed state can be set to almost 0 mm. Thus, it is understandable that this embodiment has an extremely large effect of miniaturization in the direction orthogonal to the blade running direction (horizontal size).

Then, an operation of the above-described shutter apparatus will be explained. In the shutter apparatus ready to run as shown in FIG. 1, the front shutter drive lever 20 and rear shutter drive lever 21 are attracted and held by their respective time control magnets (not shown). In this case, the end 2b on the arm base end side of the slit-forming section 2a of the front shutter slit-forming blade 2 is placed outside the operating area of the drive pin 21a so as not to interfere with the drive pin 21a of the rear shutter drive lever 21 in the case where trouble such as insufficient attraction of the time control magnet of the rear shutter occurs, the rear shutter is not held in a running ready position and only the rear shutter runs so as to close the shutter aperture 1a. Furthermore, the end 10b on the arm base end side of the slit-forming section 10a of the rear shutter slit-forming blade 10 is placed inside the operating area of the drive pin 21a, but the end 10b moves outside the operating area of the drive pin 21a as a spreading operation of the rear shutter of closing the shutter aperture 1a advances, and therefore the end 10b will not interfere with the drive pin 21a of the rear shutter drive lever 21.

When the attraction by the front shutter time control magnet is canceled by a shutter release signal, the front shutter rotates the first arm 6 and second arm 7 clockwise by the force of a front shutter drive spring (not shown) which generates a clockwise rotational force on the front shutter drive lever 20.

Due to this, the front shutter slit-forming blade 2, the #2 blade 3, #3 blade 4 and #4 blade 5 of the front shutter covering blade run so as to open the shutter aperture 1a from top down while maintaining the front shutter slit-forming section 2a, #2 blade 3, #3 blade 4 and #4 blade 5 parallel to the long side 1h of the shutter aperture 1a through the action of the parallel link. Thus, the front shutter moves up to the position shown in FIG. 2 to open the shutter aperture 1a.

In a predetermined time corresponding to a set exposure time after the attraction of the front shutter time control magnet is canceled, the attraction of the rear shutter time control magnet is canceled and the rear shutter rotates the first arm 14 and second arm 15 clockwise by the force of a rear shutter drive spring (not shown) which generates a clockwise rotational force on the rear shutter drive lever 21.

Due to this, the rear shutter slit-forming blade 10, the #2 blade 11, #3 blade 12 and #4 blade 13 of the rear shutter run so as to close the shutter aperture 1a from top down while maintaining the rear shutter slit-forming section 10a, #2 blade 11, #3 blade 12 and #4 blade 13 parallel to the long side 1h of the shutter aperture 1a through the action of the parallel link. Thus, the rear shutter moves up to the position shown in FIG. 2 to close the shutter aperture 1a and this completes exposure of the film.

In the case of a shutter charge, a charge mechanism (not shown) starts an action of giving a counterclockwise rotation to the front shutter and rear shutter drive levers, in the reverse order of the above-described exposure operation by moving the front shutter first without opening the shutter aperture 1a, moves the front shutter and rear shutter from the position in FIG. 2 to the position in FIG. 1, attracts and holds the front shutter drive lever 20 and rear shutter drive lever 21 by the respective time control magnets (not shown).

In the movement completed state in FIG. 2, when the front shutter moves first to close the shutter aperture during a shutter charge, the end 10b on the arm base end side of the slit-forming section 10a of the rear shutter is located outside the operating area of the drive pin 20a so as not to interfere with the drive pin 20a of the front shutter drive lever. On the other hand, the end 2b on the arm base end side of the slit-forming section 2a of the front shutter is located within the operating area of the drive pin 20a, but moves out of the operating area of the drive pin 20a as the spreading operation of the front shutter of closing the shutter aperture 1a advances, and therefore does not interfere with the drive pin 20a of the front shutter drive lever 20.

If the focal plane shutter apparatus of this embodiment is assumed to be mounted on a single-lens reflex camera using a 135-format silver film, the longitudinal size A of the shutter aperture 1a is 24.7 mm and horizontal size is 36.6 mm. Since the size of the shutter aperture 1a in this format is predetermined, the sizes of structures around the shutter aperture 1a can be reduced when the size of the shutter apparatus is reduced.

Here, points for miniaturization of the apparatus will be described below assuming that the distance from the end face on the shutter aperture 1a on the arm base end side (left side in FIG. 1) to the end face (1l) of the shutter base plate 1 of the arm base end supporting side (left side in FIG. 1) is B, the distance from the end face of the shutter aperture 1a on the blade end side (right side in FIG. 1) to the end face of the shutter base plate 1 of the blade end side (right side in FIG. 1) is C, the distance from the rotational center of the arm base end (1d) to the rotational center of the swaging dowel pin 8a supporting the slit-forming blade 2 at the arm end is D, the maximum arm operating angle around the rotational center of the arm base end is θ and the distance between the first and second arms of the parallel link formed of the first and second arms 6, 7 (14, 15) is E.

a. Number of Blade Group Supported on Arm in Pivotable Manner

Figure 23:
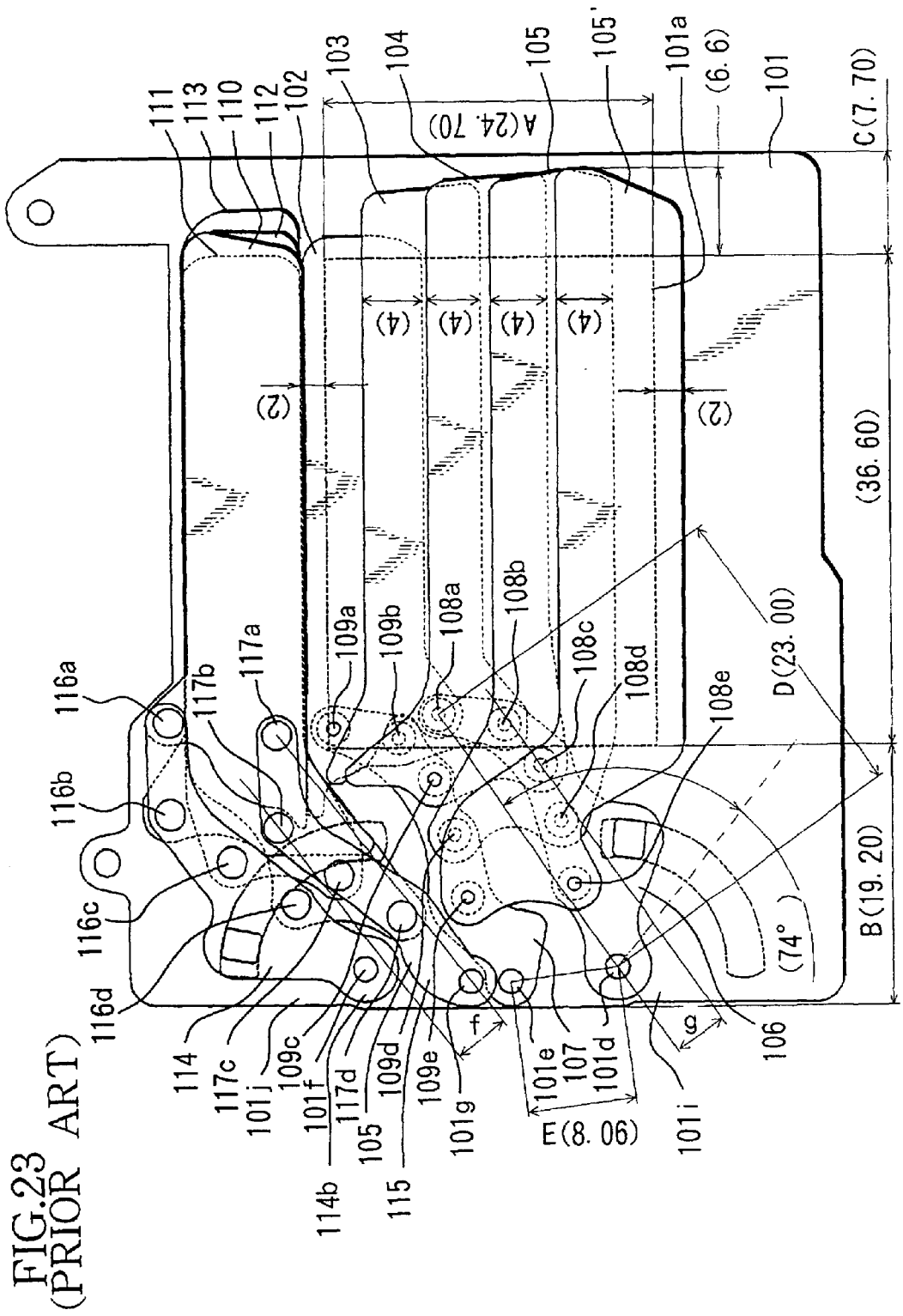
FIG. 23 illustrates a shutter apparatus (when ready to run) according to a first conventional example.

In contrast to this embodiment where both the front shutter and rear shutter have a 4-blade configuration, if five blades are supported on the arms as in the case of the front shutter in the first conventional example, the width of each blade can be smaller in the case of 5-blade configuration in a winding/charge completed state of a camera (a recent camera with a built-in motor waits for next image taking in this status) and when the front shutter spreads the blade group to close the shutter aperture under a condition of securing a predetermined amount of blade overlapping necessary for shielding (4 mm in this embodiment as shown in FIG. 1 and also 4 mm in the first conventional example as shown in FIG. 23). Thus, the first conventional example with more blades allows the blades to be folded smaller under a blade group stored condition when the shutter aperture is opened, and therefore the size in the vertical direction that matches the blade running direction is reduced.

However, since the number of blade supporting positions simply increases as the number of blade group increases and the arm length increases accordingly, the size in the shutter horizontal direction orthogonal to the blade running direction increases. On the other hand, when the extension of the arm length is minimized (the first conventional case corresponds to this), the umber of blade supporting positions increases and the margin of the arm is reduced accordingly, and therefore it is difficult to reduce the shutter size in the horizontal direction. Moreover, the blade overlapping area in the 5-blade configuration has one more blade than the 4-blade configuration, and therefore has a larger total blade area and the inertia of the blade unit as a whole including the one additional blade supporting part inevitably increases, which is disadvantageous to a high-speed movement.

On the other hand, in the case of a 3-blade configuration, the number of blade supporting locations decreases and the margin on the arm increases, which is advantageous to reducing the shutter size in the horizontal direction. However, under the condition of securing a predetermined amount of blade overlapping (for example, 4 mm) when the blade group is spread to close the shutter aperture, it is impossible to fold the blades to a small size when the blade group is stored to open the shutter aperture, and therefore the size in the vertical direction that matches the blade group running direction is increased. When an attempt is made to reduce the size in the vertical direction, the amount of overlapping among the blades when the blade group is spread is reduced, making it impossible to maintain the shielding performance. After all, the 3-blade configuration has an unfavorable balance in the aspect ratio of the shutter, which makes it difficult to mount the shutter apparatus on a camera.

To actually secure the amount of overlapping among the blades to achieve sufficient shielding performance, provide a favorable balance in the aspect ratio of the shutter and effectively reduce the horizontal size, it is best that both the front shutter and rear shutter have a 4-blade configuration as in the case of this embodiment.

b. Arm Length (Size D from Rotational Center of Arm Base End to Rotational Center of Swaging Dowel Pin for Supporting Slit-forming Blade at Arm End)

The point here is to find a way to support the blade group in a 4-blade configuration pivotably and find a minimum length of the longitudinal size A of the shutter aperture 1a that allows full movement of the slit-forming blades 2 and 10.

c. Maximum Arm Operating Angle θ Around Rotational Center of Arm Base End

If the arm length D is reduced according to b. above, in order for the moving distance of the slit-forming blade to clear the longitudinal size A of the shutter aperture 1a, θ is naturally increased accordingly.

d. Size E Between First and Second Arms

One aspect is that when the maximum arm operating angle θ increases, if the distance between the arms remains the same as before, interference between the first arm and second arm, especially interference between the blade connections occurs when the blade group is spread or stored (superposed), failing to obtain a sufficient operating angle.

Another aspect is that when the operating angle increases, the blade connections of the slit-forming blades 2 and 10 and the blade ends on the opposite side occupy a large area of the shutter aperture 1a in a state close to a blade group spread state or stored (superposed) state.

Since there is engagement rearlash in the blade connections and this rearlash is amplified as the distance from the blade connections increases, this means degradation of the parallelism between the slit-forming blades 2 and 10 (slit-forming sections 2a and 10a).

In order to solve the above-described two problems, the size E between the first and second arms is increased. Furthermore, based on the characteristic of the parallel link, expanding a span between the arms that form the parallel link improves stability of the parallelism while the slit-forming blade supported by the arms are operating.

e. Size C from End Face of Shutter Aperture 1a on Blade end Side to End Face of Shutter Base Plate 1 on Blade End Side If the arm length D is reduced and the maximum arm operating angle θ is increased, the amount of displacement in the direction orthogonal to the running direction of the blade group (especially slit-forming blade) by an opening/closing operation is increased, which is disadvantageous to reducing the distance C. However, it is possible to reduce the distance C by reducing the radius of the corner R (2c, 10c) of the slit-forming section of the slit-forming blade on the end side to a necessary minimum so as to provide the slit-forming section up to close to the ends of the blades, shortening the slit-forming blade, simplifying the shape of the end of each blade into a rectilinear shape along the end face of the shutter base plate 1 so as to set the amount of overlapping between the each blade end while the blade group is spread and the shutter base plate 1 around the shutter aperture 1a or cover plate to the same level as that of the conventional art to secure the shielding performance or to prevent the blades from penetrating by the user's careless pushing with his/her finger, etc.

f. Arrangement of Blade Connections (Blade Swaging Dowel Pins) on Arm

FIG. 3 and FIG. 4 show effects related to the arrangement of the blade connections on the arms and FIG. 3 illustrates an effect on the slit-forming section and FIG. 4 illustrates the shielding section. Both are plan views in the middle of a shutter movement and only show the rear shutter since both the front shutter and rear shutter have the same structure.

In these drawings, reference numeral 10b denotes an end on the arm base end side of the slit-forming section 10a of the slit-forming blade 10; 18 (shown by two-dot dashed line in FIG. 3), a swaging dowel pin of the #3 blade 12 placed according to the conventional art; 11a, an arm side shielding fraction of the #2 blade 11; 12a, an arm side shielding fraction of the #3 blade 12.

Figure 24:
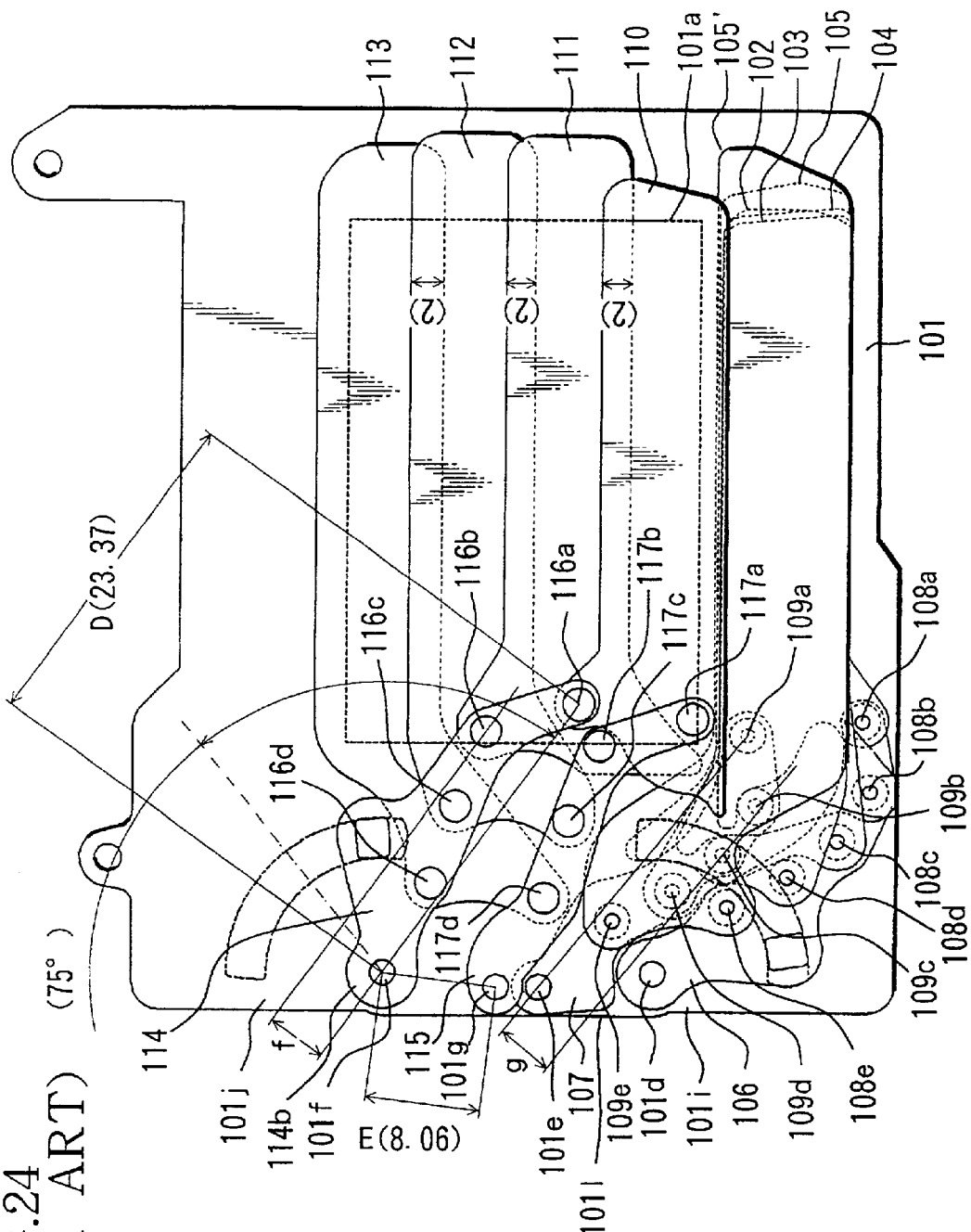
FIG. 24 illustrates the shutter apparatus (when running is completed) according to the first conventional example.

As shown in FIG. 23 and FIG. 24, according to the conventional arrangement of the blade connections on the arms, in the case of the rear shutter in a 4-blade configuration, when based on the distance from the line segment connecting the rotational centers 101f and 101g of the arm base end and the rotational centers of the connections (pins) 116a and 117a of the slit-forming blade at the arm ends, the rotational center of the connections (pins) 116b and 117b of the #2 blade out of the rotational centers of the blade connections are most distant (the distance is shown by "f" in the drawings), followed by those for the #3 blade and #4 blade.

On the other hand, in the case of the front shutter in a 5-blade configuration, when based likewise on the distance from the line segment connecting the rotational centers 101d and 101e of the arm base end and the rotational centers of the connections(pins) 108a and 109a of the slit-forming blades at the arm ends, the rotational centers of the connections(pins) 108c and 109c of the #3 blade out of the rotational centers of the blade connections are most distant (the distance is shown by "g" in the drawings), followed by those for the #2 blade, #4 blade and #5 blade.

As mentioned above, to effectively reduce the horizontal size of the shutter, it is best that both the front shutter and rear shutter have a 4-blade configuration, and therefore if the blade connections are arranged on the arms according to the conventional art by adopting blade group in a 4-blade configuration, the position of the #3 blade swaging dowel pin 18 is as indicated by two-dot dashed line in FIG. 3.

In this case, the end 10b on the arm base end side of the slit-forming section 10a of the slit-forming blade 10 interferes with the #3 blade swaging dowel pin 18, and therefore as indicated by an arrow, the end 10b on the arm base end side needs to be moved toward the blade end side by approximately 1.5 mm as 10b' (shown by two-dot dashed line). In such a case, the outline of the end 10b' on the arm base side draws a movement trail as indicated by "H" and enters the shutter aperture 1a, making slit formation as the shutter no longer possible.

To avoid this, it is necessary to extend the end of the slit-forming blade 10 by approximately 1.5 mm and move the entire blade unit toward the arm base end side (leftward in the figure) by approximately 1.5 mm with respect to the shutter aperture 1a.

Furthermore, not only this but also the arm side shielding fraction 11a of the #2 blade 11 interferes with the #3 blade swaging dowel pin 18, and therefore the shielding fraction 11a must be moved in other ways.

For example, as indicated by hatching in the drawing, if the shielding fraction 11a is removed, an area 19 (gap formed between the slit-forming blade 10 and the arm side shielding fraction 12a of the #3 blade 12) that cannot be shielded in the middle of the operation of the blade unit as shown in FIG. 4 is produced preventing the shutter function. In this case, this problem cannot be solved by only increasing the horizontal size of the shutter by 1.5 mm compared to this embodiment and it is only a small amount of the horizontal size that can be reduced compared to the shutter in the first conventional example.

In contrast to this, in the arrangement of the blade connections on the arms according to this embodiment, when based likewise on the distance from the line segment connecting the rotational centers 1f and 1g of the arm base end and the rotational centers of the connections(pins) 16a and 17a of the slit-forming blade 10 at the arm end, the rotational centers of the connections 16c and 17c of the #3 blade 12 out of the rotational centers of the blade connections are most distant (the distance is shown by "F" in the drawings), followed by those for the #2 blade 11 and #4 blade 13.

Such an arrangement avoids interference between the end 10b on the arm base end side of the slit-forming section 10a of the above-described slit-forming blade 10 and the #3 blade swaging dowel pin 17c and the outline of the end 10b on the arm base end side draws a movement trail which does not enter the shutter aperture 1a as indicated by "I".

Furthermore, the shielding fraction 11a on the arm side of the #2 blade 11 does not interfere with the #3 blade swaging dowel pin 17c and can form a sufficient shielding fraction 11a on the arm side, thus assuring light shielding in the middle of operation, too.

This allows the shutter apparatus of this embodiment to reduce the horizontal size by 6 mm compared to the shutter in the first conventional example.

Then, sizes of different sections will be explained more specifically. First, with respect to the B size, in the first conventional example shown in FIG. 23 and FIG. 24, it is 19.2 mm and can be reduced about 1 mm by reducing the diameter of the blade swaging dowel pin or reducing the margin between the blades during or after a movement. However, further reduction of the B size will cause the end of the slit-forming section on the arm base end side of the slit-forming blade to enter inside the shutter aperture, and therefore it is impossible to form a rectangular slit formed of the slit-forming section and shutter aperture of the front shutter and rear shutter, preventing the shutter function. For this reason, the technology of the present invention is necessary to reduce the B size by 2 mm or more.

On the other hand, the shutter with a generally optimal balance and miniaturized by the technology of the present invention is the shutter apparatus described in this embodiment and its B size is 14.2 mm and to further pursue the limit of miniaturization, the material of the rotational center axes 1d, 1e, 1f and 1g of the arm base end is changed from plastics that can be molded as one body with the shutter base plate 1 to metal such as stainless steel, etc. and the diameter of the axis is reduced from $\phi 1.6$ mm to $\phi 1.0$ mm. Together with this, the outside radius of the base ends of the arms of the front shutter and rear shutter is reduced by 0.3 mm. This makes it possible to shift the end face of the left shutter base plate 1 on the left side in FIG. 1 to the right.

Thus, a size reduced by 2 mm from the size in the first conventional example is an upper limit of the B size and a size reduced by 0.3 mm from the size of this embodiment is a lower limit of the B size, and therefore this can be expressed by the following relational expression:

$$\{(14.2-0.3)/24.7\}A \leq B \leq \{(19.2-2)/24.7\}A \therefore 0.56 A \leq B \leq 0.70A \quad (1)$$

The technology of the present invention allows the B size to be freely selected within the B size range in the above-described expression (1).

Then, with respect to the C size, in the first conventional example shown in FIG. 23 and FIG. 24, it is 7.7 mm, and if the minimum limit at which a reduction of size is perceptible even in a minor degree is assumed to be 0.3 mm, then the upper limit becomes 7.4 mm. Since the C size is almost determined by the trail of the end of the slit-forming blade, as shown in "e" above, if the arm length D is reduced and the maximum arm operating angle θ is increased as in the case of the present invention, the amount of displacement in the direction orthogonal to the running direction of the blade group (especially slit-forming blade) due to the opening/closing operation is increased, which is disadvantageous for reducing the size C.

However, the C size can be set to 6.7 mm with the shutter apparatus with generally optimal balance and miniaturized by the technology of the present invention. For further miniaturization, if the corner R of the slit-forming section of the slit-forming blade on the end side is reduced to a necessary minimum (almost zero) so that the slit-forming section reaches almost the end of the blade, it is possible to cut the length of the end of the slit-forming blade by additional 0.7 mm. If the end of the blade other than the slit-forming blade is also cut by approximately 0.7 mm, the lower limit of the C size becomes 6.0 mm. Making the C size smaller than this will cause the slit-forming section to enter inside the shutter aperture 1a when the blade group is operating, preventing the shutter function.

Furthermore, when the blade group is spread it is impossible to secure even a minimum amount of overlapping between the end of each blade and the shutter base plate 1 around the shutter aperture 1a or the cover plate necessary to secure the shielding performance or prevent the blades from penetrating by the photographer's careless pressing.

Thus, the C size can be expressed by the following expression:

$$(6.0/24.7) A \leq C \leq (7.4/24.7) A \therefore 0.24 A \leq C \leq 0.30 A \quad (2)$$

Use of the technology of the present invention allows the C size to be selected freely within the C size range in the above-described expression (2).

Then, with respect to the D size, it is 23.0 mm in the first conventional example shown in FIG. 23 and FIG. 24 and as the aforementioned B size of 19.2 mm in the first conventional example is reduced by 2 mm, the technology of the present invention will also be used in this case.

Figure 5:
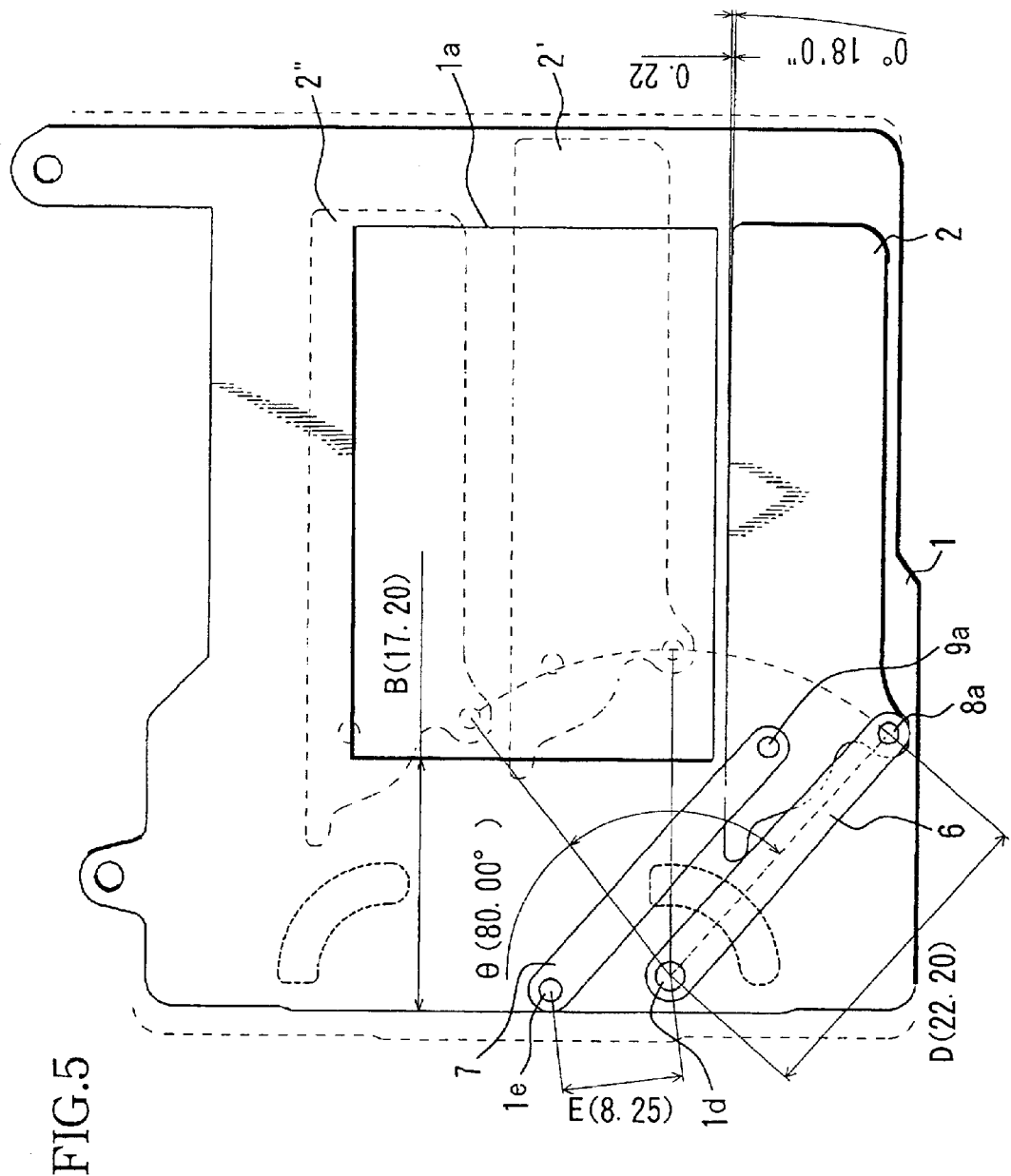
FIG. 5 illustrates the focal plane shutter apparatus when running is completed, schematically showing a balance between the arms of the front shutter slit-forming blade with respect to the size of a shutter base plate and an inclination of the slit-forming section.

Here, FIG. 5 schematically shows a balance between the front shutter arm and slit-forming blade with respect to the size of the shutter base plate 1 and the inclination of the slit-forming section in a running completed state and reference numeral 2' indicated by two-dot dashed line denotes the slit-forming blade moved to the end to the full and reference numeral 2" denotes the slit-forming blade moved to a running ready position. The same applies to the rear shutter and therefore explanations thereof are omitted in FIG. 5.

In this FIG. 5, the size D is 22.2 mm. The D size is 19.8 mm with the shutter apparatus of this embodiment with a generally optimal balance and miniaturized by the technology of the present invention, and when the limit of miniaturization is further pursued, the D size can be further reduced by 0.5 mm to 19.3 mm. This size reduction can be realized by increasing the maximum arm operating angle θ, thinning the shapes of the first and second arms which would interfere with each other as they are to increase the amount of escape, reducing the diameter of the blade swaging dowel pin, relaxing the constraining conditions of the blade shapes such as shielding fractions near the arms and reducing the amount of overlapping between the adjacent blades when the blades are spread to a necessary minimum. This will be shown in FIG. 6.

Figure 6:
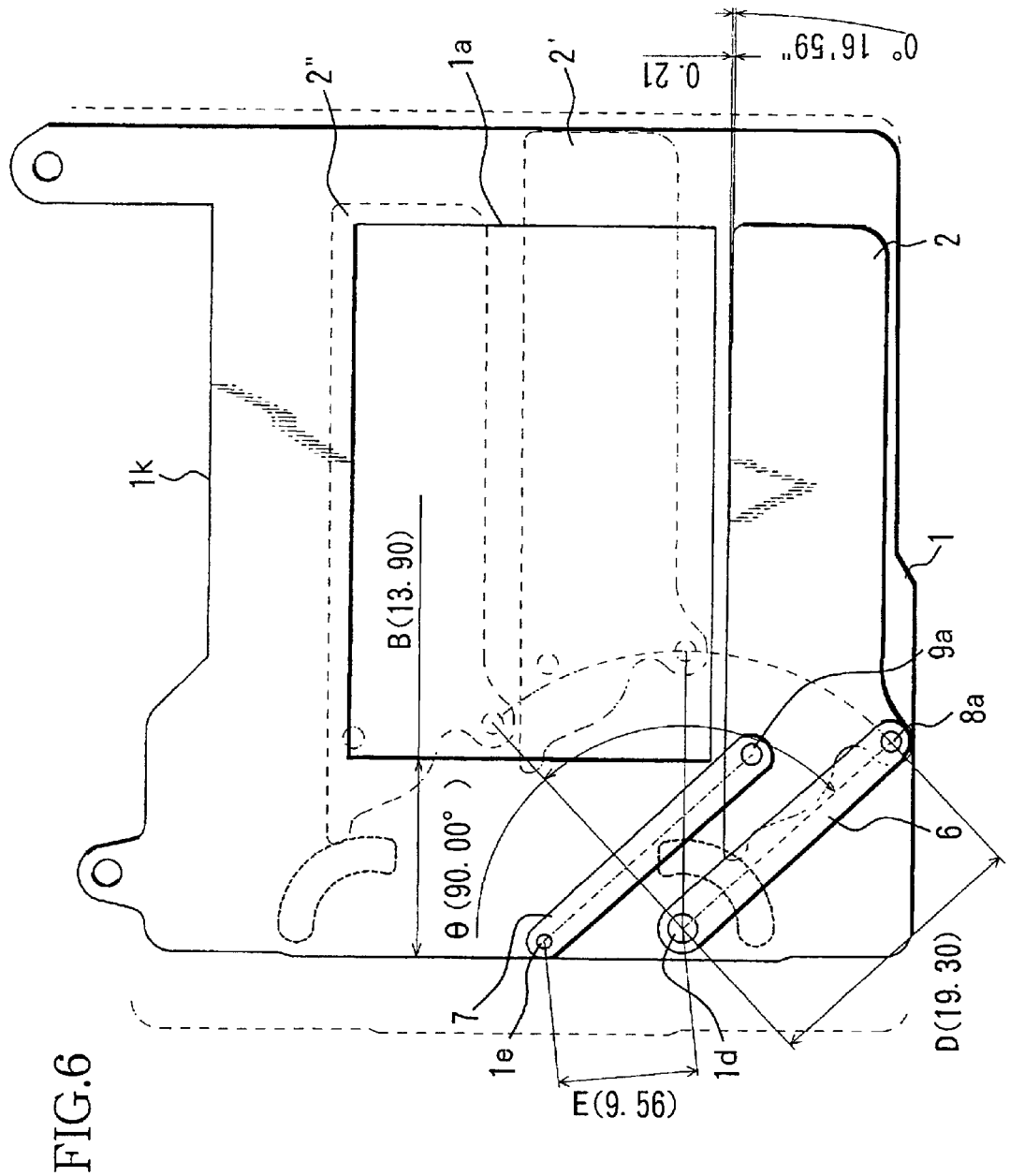
FIG. 6 illustrates the focal plane shutter apparatus when running is completed, schematically showing a balance between the arms of the front shutter and slit-forming blade with respect to the size of a shutter base plate and an inclination of the slit-forming section.

FIG. 6 schematically shows a balance between the front shutter arm and slit-forming blade with respect to the size of the shutter base plate 1 and the inclination of the slit-forming section in a running completed state and reference numeral 2' indicated by two-dot dashed line denotes the slit-forming blade moved to the end to the full and reference numeral 2" denotes the slit-forming blade moved to a running ready position. The same applies to the rear shutter and therefore explanations thereof are omitted in FIG. 6.

Making the size D smaller than this will make it difficult to support each blade in terms of space and thinning the arm shape or reducing the diameter of the blade swaging dowel pin will reduce the arm strength and blade swaging strength excessively, which will cause a collapse. This also makes light shielding insufficient, failing to function as the shutter.

Therefore, the D size can be expressed by the following relational expression:

$$(19.3/24.7) A \leq D \leq (22.2/24.7) A \therefore 0.78A \leq D \leq 0.90A \quad (3)$$

Use of the technology of the present invention allows the D size to be freely selected within the D size range in the above-described expression (3).

Then, with respect to the maximum arm operating angle $\theta$, the arm operating angle from a running completed state to a running ready state in the first conventional example shown in FIG. 23 and FIG. 24 is 74° to 75° and when a maximum overcharge is assumed to be 4° (the overcharge fluctuates between 0 and 4° depending on the individual shutters with a size adjustment roller of a charge mechanism (not shown)), the total arm operating angle becomes 79°.

In connection with the aforementioned B size of 17.2 mm and D size of 22.2 mm, if the technology of the present invention is used, the lower limit of the maximum arm operating angle $\theta$ becomes 80°+(overcharge 0 to 4°) as shown in FIG. 5. In the shutter apparatus with a generally optimal balance and miniaturized by the technology of the present invention, $\theta$ becomes 87°+(overcharge 0 to 4°) and when the limit of miniaturization is further sought, $\theta$ becomes 90°+(overcharge 0 to 4°) in contrast to the aforementioned D size of 19.3 mm as shown in FIG. 6.

Therefore, $\theta$ can be expressed by the following relational expression:

$$80° \leq \theta \leq 94° \quad (4)$$

Use of the technology of the present invention allows $\theta$ to be freely selected within the $\theta$ range in the above-described expression (4).

However, when $\theta$ is increased, the positions (6a, 14a) at which the drive pins 20a and 21a of the front shutter drive lever 20 and rear shutter drive lever 21 which give movement energy by a spring force to the front shutter and rear shutter, respectively are fitted in the first arms 6 and 14 are restricted.

That is, since the front shutter drive lever 20 and rear shutter drive lever 21 rotate concentric with the rotational centers 1d and 1f of the first arms 6 and 14, if the turning radius of the drive pin is increased, the area occupied by the drive pin operating trail extends as $\theta$ increases and the degree of freedom of the blade position is reduced, which becomes disadvantageous for miniaturization. Therefore, the turning radius of the drive pin needs to be minimized.

Moreover, it is desirable to bring the position of each drive pin (20a in FIG. 2 and 21a in FIG. 1) closer to the left end of the shutter base plate 1 as much as possible in a running completed state of the front shutter and a charge completed state to an overcharged state of the rear shutter.

Furthermore, cameras in recent years adopt a system of winding a film by means of a friction using a spool wrapped with rubber instead of using a sprocket for the film feeding mechanism and detect the film screen using a photosensor instead of detecting the amount of rotation of the sprocket. For this reason, the conventional camera is provided with an escape from an area above and below the left end of the shutter base plate from a given area according to the shape of the sprocket that exists to the left of the shutter next to the wall (not shown) of the camera body (101i and 101j in FIG. 23 and FIG. 24).

On the other hand, the shutter apparatus of this embodiment takes into account the fact that there is no need to provide this escape of the sprocket, minimizes the turning radius of the drive pin as much as possible and brings the position of each drive pin (20a in FIG. 2 and 21a in FIG. 1) closer to the left end of the shutter base plate 1 as much as possible in a running completed state of the front shutter and charge completed state to an overcharged state of the rear shutter so that the front shutter comes right below and the rear shutter comes right above the rotational centers 1d and 1f of the first arms 6 and 14.

Then, this embodiment is designed to realize miniaturization in the direction orthogonal to the blade running direction by minimizing the turning radiuses of the drive pins 20a and 21a down to a size smaller than the turning radiuses of the #4 blade swaging dowel pins 8d and 16d located innermost on the first arms 6, 14, which is effective in reducing the size of the shutter (in other words, the operating area of the drive pins 20a, 21a are located closer to the rotational axis of the base end of the first arms 6, 14 than the operating areas of any other blade swaging dowel pins on the first arms 6, 14), allowing the end 2b on the arm base end side in the slit-forming section 2a of the front shutter slit-forming blade 2 to enter the operating area of the drive pin 20a in the position in which the end 2b never interferes with the drive pin 20a of the front shutter drive lever 20 (the position in which the drive pin 20a passes during the front shutter spreading operation) to effectively utilize space during superposing of the front shutter in FIG. 2, and allowing the end 10b on the arm base end side in the slit-forming section 10a of the rear shutter slit-forming blade 10 to enter the operating area of the drive pin 21a in the position in which the end 10b never interferes with the drive pin 21a of the rear shutter drive lever 21 (the position in which the drive pin 21a passes during the rear shutter spreading operation) to effectively utilize space during superposing of the rear shutter in FIG. 1.

Then, with respect to the E size, it is 8.06 mm in the first conventional example shown in FIG. 23 and FIG. 24, and the parallelism of the slit-forming section at this time is expressed with the inclination angle of the slit-forming section and the distance between both ends of the slit-forming section (rectilinear segment) in the blade running direction (longitudinal direction in the figure). As the conditions, suppose there is no engagement backlash of the rotational axes (101d, 101e, etc.) of the arm base end, engagement of the blade swaging dowel pins that connect the slit-forming blades to the arms is hole class H8 and axis class f8 and maximum backlash for diameter $\phi 1.5$ mm is 34 $\mu$m. The result will be shown in FIG. 9.

Figure 9:
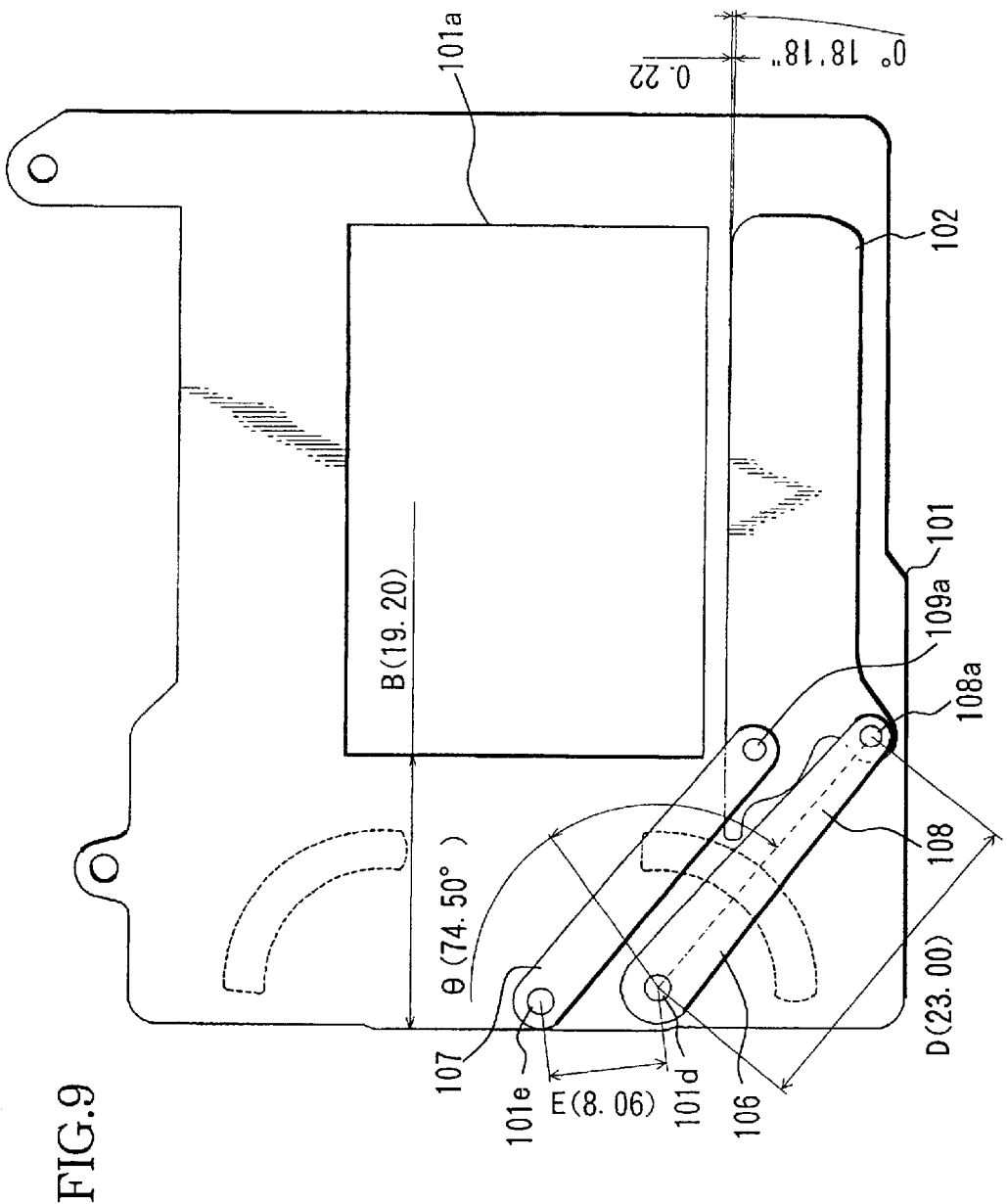
FIG. 9 illustrates the focal plane shutter apparatus when running is completed, schematically showing a balance between the arms of the front shutter and slit-forming blade with respect to the size of a shutter base plate and an inclination of the slit-forming section.

FIG. 9 illustrates the shutter apparatus when running is completed schematically showing a balance between the front shutter arm and slit-forming blade with respect to the size of the base plate and an inclination of the slit-forming section and the same applies to the rear shutter, and therefore the explanations thereof are omitted.

According to FIG. 9, the inclination angle of the slit-forming section is 0° 18' 18" and the distance in the blade running direction between both ends of the slit-forming section is 0.22 mm.

In connection with the aforementioned B size of 17.20 mm, D size of 22.2 mm and lower limit of maximum arm operating angle θ of 80°, in order to maintain the inclination angle of the slit-forming section and the distance in the blade running direction between both ends of the slit-forming section at the same level or higher under the same backlash conditions as those for the above-described example using the technology of the present invention, the E size must be 8.25 mm as shown in FIG. 5.

Figure 7:
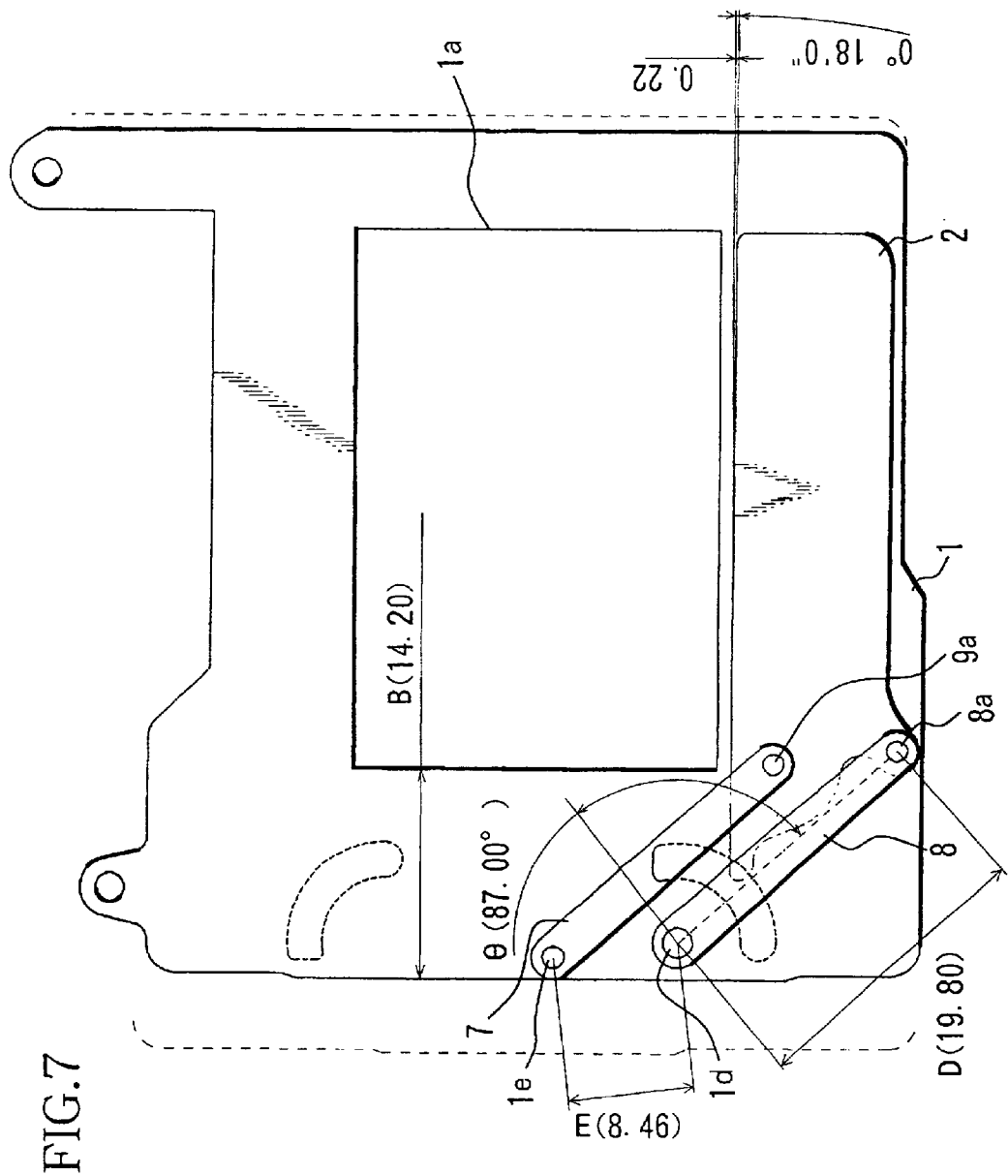
FIG. 7 illustrates the focal plane shutter apparatus when running is completed, schematically showing a balance between the arms of the front shutter and slit-forming blade with respect to the size of a shutter base plate and an inclination of the slit-forming section.

With the shutter apparatus of this embodiment with a generally optimal balance and miniaturized by the technology of the present invention, the E size is 8.46 mm and the inclination angle of the slit-forming section 0° 18' 0" and the distance in the blade running direction between both ends of the slit-forming section is 0.22 mm under the same backlash conditions as those in the above-described conventional example as shown in FIG. 7, which shows a slight improvement to the conventional apparatus. By the way, FIG. 7 illustrates the shutter apparatus of this embodiment when movement is completed schematically showing a balance between the front shutter arm and slit-forming blade with respect to the size of the shutter base plate and an inclination of the slit-forming section and the same applies to the rear shutter and so the explanations thereof are omitted.

Figure 8:
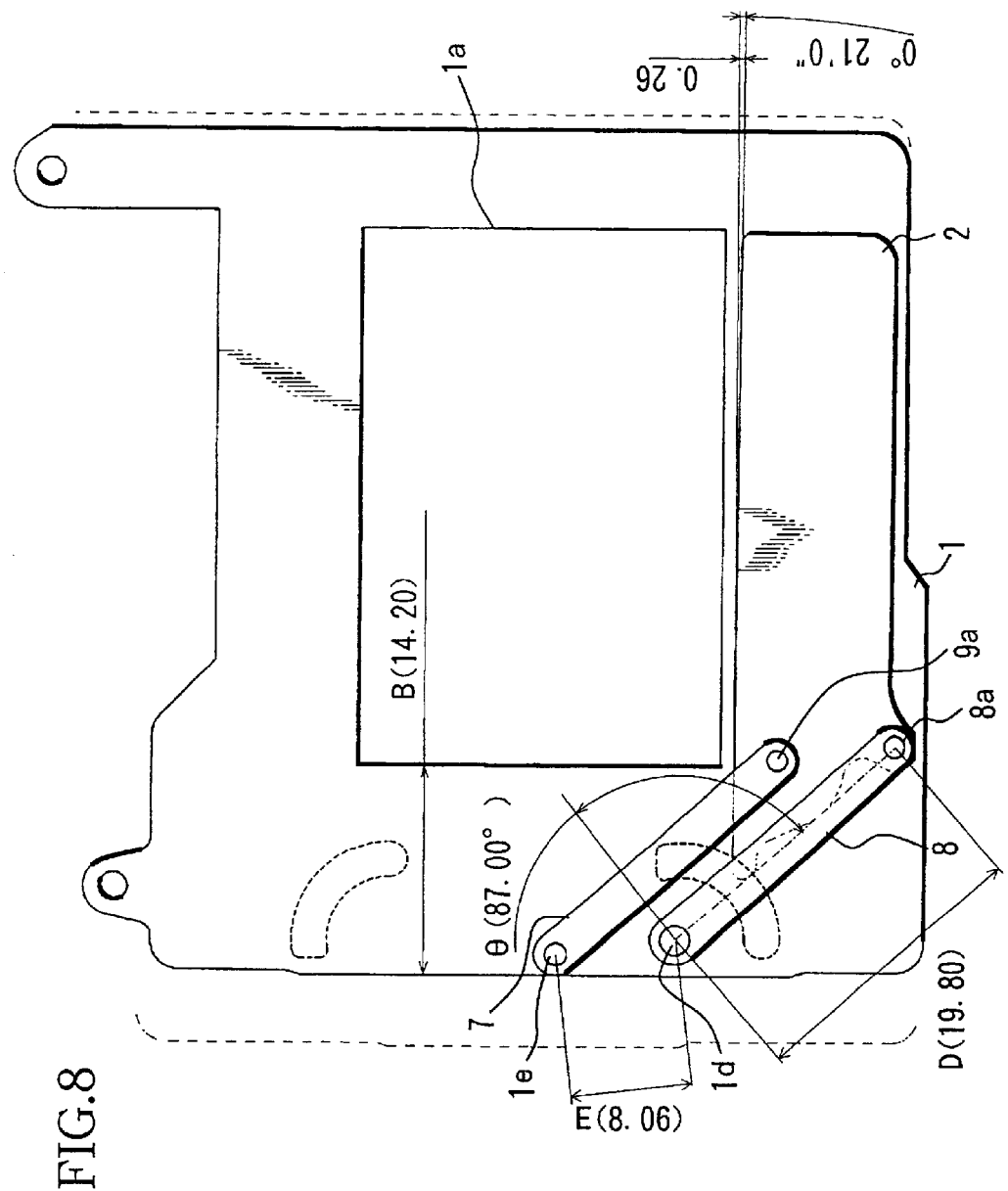
FIG. 8 is a drawing, which only differs from FIG. 7 in the E size.

As shown in FIG. 8 (drawing of the case where only the E size is different from FIG. 7), if the E size of the shutter apparatus of this embodiment remains unchanged from the conventional size of 8.06 mm, the inclination angle of the slit-forming section becomes 0° 21' 0" and the distance in the blade running direction at both ends of the slit-forming sections becomes 0.26 mm under the same backlash conditions as those of the above-described conventional example, which means degradation of the parallelism of the slit-forming section compared to the conventional apparatus.

This means degradation of exposure irregularities on the exposure screen. After all, it is reasonable to increase the E size to 8.46 mm so that the miniaturized shutter apparatus of this embodiment is not inferior to the conventional apparatus in performance.

To further pursue the limit of miniaturization, the technology of the present invention is used to meet the aforementioned D size of 19.3 mm and upper limit of the maximum arm operating angle θ of 94° and as described above, the material of the rotational center axes $1d$, $1e$, $1f$ and $1g$ of the arm base end is changed from plastics molded as one body with the shutter base plate to metal such as stainless steel and the axis diameter is reduced from φ1.6 mm to φ1.0 mm. Together with this, the outside radius of the base end of the front shutter and rear shutter arms is reduced by 0.3 mm. This allows both the front shutter and rear shutter in FIG. 1 to approach by 0.3 mm in the longitudinal direction.

In addition, if the shutter size in the longitudinal direction is allowed to be the same as that of the first conventional example without expanding the part $1k$ which is adjacent to the optical path of the finder eyepiece of the camera, the first arm of both the front shutter and rear shutter can be moved 0.8 mm in the vertical direction.

Therefore, when all these sizes are totalized, the E size becomes 9.56 mm. As shown in FIG. 6, the inclination angle of the slit-forming section is 0° 16' 59" and the distance in the blade running direction at both ends of the slit-forming section becomes 0.21 mm under the same backlash conditions as those in the above-described conventional example, which means an improvement to the conventional apparatus. By the way, further increasing the E size will influence the finder eyepiece optical path of the camera and increase the size in the longitudinal direction of the shutter, which is not desirable.

Thus, the E size is expressed by the following relational expression:

$$(8.25/24.7)\,A \leq E \leq (9.56/24.7)\,A \therefore 0.33\,A \leq E \leq 0.39A \quad (5)$$

Use of the technology of the present invention allows the E size to be freely selected within the E size range in the above-described expression (5).

Though in the above explanations, the size B from the end face on the arm base end side (left side in FIG. 1) of the shutter aperture $1a$ in this embodiment to the end face of the shutter base plate 1 on the side supporting the arm base end (left side in FIG. 1), the size C from the end face on the blade end side (right side in FIG. 1) of the shutter aperture $1a$ to the end face of the shutter base plate 1 on the blade end side (right side in FIG. 1), the size D from the rotational center of the arm base end side to the rotational center of the swaging dowel pin to connect the slit-forming blade at the arm end, the maximum arm operating angle θ around the rotational center of the arm base end, and the size E between the first and second arms of the parallel link formed of the first arm and second arm are expressed as being individually selectable within the ranges of Expressions (1) to (5), there are appropriate (well-balanced) combinations among the respective sizes as shown in FIG. 5 to FIG. 7.

Furthermore, the key elements for miniaturization are the D size and θ and it is possible to adjust interference between the blade connections and maintain the parallelism of the slit-forming blade by adjusting the E size, and secure the shielding performance such as adjustment of interference between the blade connections and maintenance of the amount of overlapping among the blades by devising the arrangement of the blade connections on the arms. The B size and C size are the sizes that can be derived from D, θ and E.

Then, FIG. 10 shows a single-lens reflex camera when the back cover is opened incorporating the shutter apparatus of this embodiment, that is, the shutter apparatus with a protruding section $5a$ for reinforcing penetration resistance provided for the #4 front blade 5.

In FIG. 10, reference numeral 51 denotes a camera body; $51a$, an exposure aperture (aperture); $51b$, a cartridge chamber to load a film cartridge; $51c$, a spool chamber on the film winding side; 52, a film winding spool; 53, a back cover (cover); 54, a film pressure plate; 55, a finder eyepiece window; 56, a picture-taking mode dial; 57, a selection up/down dial; 58, a shutter release button; 59, an external display; 60, a picture(image)-taking lens.

A recent camera generally incorporates a motor which allows the front shutter and rear shutter of the shutter to move to a movement (running) ready position immediately after exposure is completed, and therefore the front shutter takes charge of shielding light in a normal condition of the camera and when the user opens the rear cover, the front shutter covers the exposure aperture $51a$ of the camera as shown in FIG. 10.

Therefore, when the user opens the back cover to replace the film, the user might touch or press the front shutter of the shutter with his/her finger by mistake.

Thus, FIG. 11 shows the situation in which the user presses almost the central position of the exposure aperture 51a of the front shutter of the focal plane shutter apparatus of this embodiment from the back cover side with his/her finger.

In FIG. 11, reference numeral 23 indicated by broken line denotes a cover plate facing the shutter base plate 1 to form space for movements of the front shutter and rear shutter and there is a parting plate (not shown) between this cover plate 23 and shutter base plate 1 which separates the front shutter movement space on the shutter base plate 1 side from the rear shutter movement space on the cover plate 23 side. In the central area of the cover plate 23, an aperture 23a is formed facing the shutter aperture 1a. A similar aperture is also formed in the central area of the parting plate.

For example, when the front shutter near the center of the aperture is pressed with a finger 61, the #2 front blade 3 of the front shutter is directly pressed, then the #3 front blade 4 below (on the shutter base plate 1 side) overlapping therewith by an amount of overlapping of 4 mm is pressed, and the #4 front blade 5 below overlapping therewith by an amount of overlapping of 4 mm is pressed. In this case, the thick #1 front blade 2 is not pressed and has no contribution to resistance to the pressure.

At this time, it is the #4 front blade 5 that holds on at the bottom, and while the #2 front blade 3 and #3 front blade 4 are supported by the shutter aperture peripheral section of the shutter base plate 1 which is a rigid body at the root and end of the blade, the #4 front blade 5 is supported not only at the root and ends of the blade but at the lower part of the shutter aperture peripheral section of the shutter base plate 1 whose bottom is a rigid body.

Therefore, the shape of the #4 front blade 5 has a great effect on the magnitude of resistance to penetration of the shutter aperture 1a by the front shutter. For example, when the thickness of the front blades #2 to #4 is 90 µm, as indicated by two-dot dashed line 51 in FIG. 1, the maximum value of the penetration resistance when there is an overlap of approximately 2 mm from the edge of the shutter aperture with respect to the lower part of the shutter aperture peripheral section of the #4 front blade 5 on the shutter base plate 1 is approximately 130 gf (1.27N).

On the contrary, when the protruding section 5a is provided as in the case of this embodiment, the maximum value of the penetration resistance when there is an overlap of approximately 4 mm from the edge of the shutter aperture with respect to the lower part of the shutter aperture peripheral section on the shutter base plate 1 of the #4 front blade 5 is 165 gf (1.62N), which is an improvement as great as 27%.

When the #4 front blade 5 is not provided with the protruding section 5a (that is, when the #4 front blade 5 has a shape indicated by two-dot dashed line 51 in FIG. 1), the #1 front blade 2 and #2 front blade 3 have large blade widths and the #3 front blade 4 and #4 front blade 5 have small blade widths, and in this way while the #1 front blade 2 and #2 front blade 3 touch the stopper rubber 22 in the running completed state in FIG. 2, the #3 front blade 4 and #4 front blade 5 do not touch the stopper rubber 22.

Thus, the protruding section 5a is provided at the bottom in the generally center of the blade longitudinal direction of the #4 front blade 5 to allow the #4 front blade 5 to also touch the stopper rubber 22 at the end 5b in the running completed state, thus making it possible to increase the resistance to blade penetration and at the same time improve the buffering effect when the blades are stopped.

Moreover, of the group of four blades, it is the #4 front blade 5 that moves(runs) the smallest distance during an operation of the blade, and therefore even if the protruding section 5a is provided, the #4 front blade 5 can still suppress the increment rate of blade inertia to a small value. Of course, extending the shape of the two-dot dashed line 51 of the #4 front blade 5 up to the position of the end 5b can also increase the resistance to blade penetration, but considering the effect, the inertia increment is disadvantageous to the case where the protruding section 5a is provided only at the bottom in the center.

Furthermore, it is desirable to provide the protruding section 5a for the #4 front blade 5 near the center of the width in the direction substantially orthogonal to the blade running direction with respect to the shape of the shutter aperture 1a in a charge completed state.

This is because the resistance of the blade is a minimum when an oblong card-shaped blade such as the #4 front blade 5 is placed over the three sides (both sides and lower hem) of the shutter aperture 1a and a pressing force is applied to the upper center of the blade located inside the shutter aperture 1a from the direction perpendicular to the plane of the blade, and greater resistance is produced when the blade supporting point (position) is closer to the pressing position or when greater support can also be secured for large displacement.

This embodiment adopts a smooth shape for the protruding section 5a and can thereby reduce operating resistance and prevent catching in a warped condition when a pressure is applied to the blade.

As described above, the shutter apparatus of this embodiment can effectively enhance penetration resistance of the shutter aperture by the blade (front shutter) without an unnecessary increase of the blade inertia.

In this way, it is possible to provide a shutter apparatus which is small in size, especially small in the direction orthogonal to the blade running direction, capable of securing an amount of overlapping among blades for light shielding, having small inertia of the blade unit, high operating efficiency and suitable for high-speed operation with a suppressed probability that the shutter blade will penetrate the shutter aperture even if the user touches the shutter blades by mistake when the user opens the back cover of the camera to load a film, thus providing a shutter with high reliability.

Furthermore, if the shutter speed is kept at the same level as the conventional one without applying the advantage of having small inertia of the blade unit to an improvement of the shutter speed, the necessary shutter charge energy decreases, which allows the charge mechanism to be simplified and reduces the thickness of the apparatus making it possible to reduce the size of the camera. Moreover, this is convenient for increasing the frame speed for continual picture taking by the camera.

Figure 12:
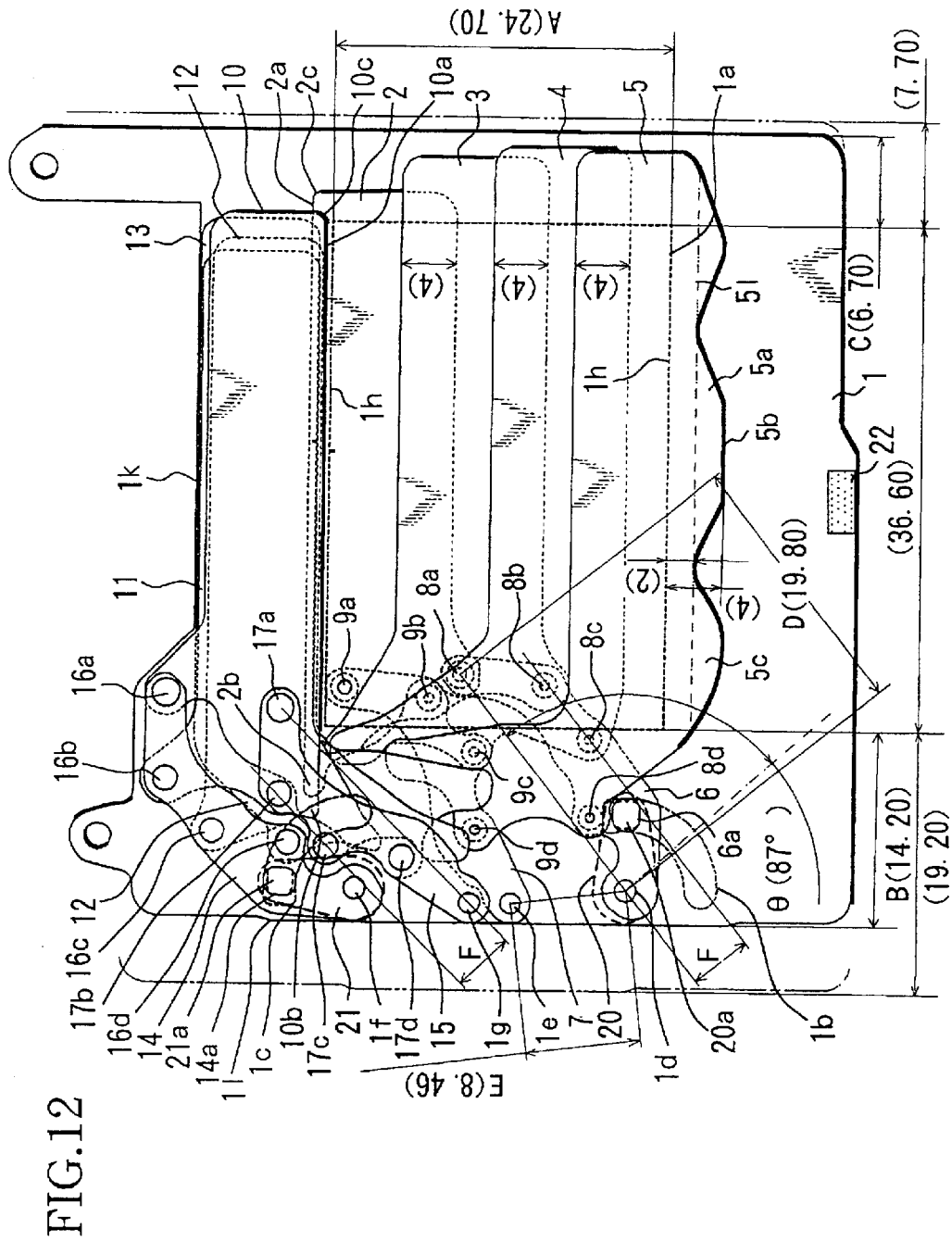
FIG. 12 is a front view showing a focal plane shutter apparatus (when ready to run), which is another embodiment of the present invention.
Figure 13:
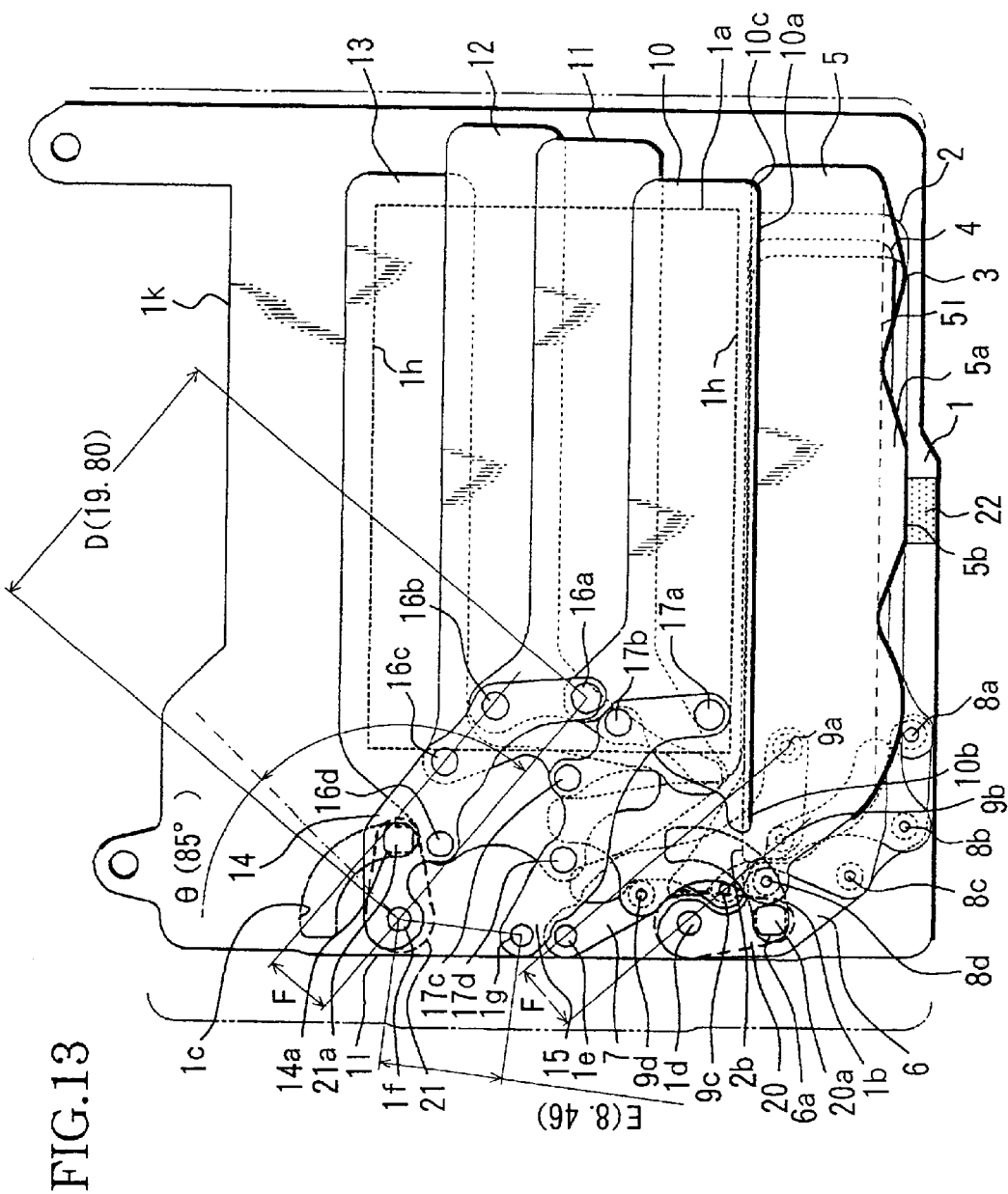
FIG. 13 is a front view showing the focal plane shutter apparatus (when running is completed) in FIG. 12.

FIG. 12 and FIG. 13 show a configuration of the focal plane shutter apparatus, which is another embodiment of the present invention. FIG. 12 shows a running ready state and FIG. 13 shows a running completed state. The components of this embodiment common to those of the above-described embodiment are assigned the same reference numerals.

The shutter apparatus of this embodiment differs from the shutter apparatus of the above-described embodiment in that when the front shutters are spread, a plurality of protruding sections 5a, 5c and 5d which overlap with the lower part of the peripheral section of the shutter aperture on the shutter base plate 1 is formed near the central area and left and right thereto at the bottom of the #4 front blade 5 in the blade longitudinal direction (direction orthogonal to the blade running direction).

Of these protruding sections, the protruding section 5a near the center has an end 5b that touches the front shutter stopper rubber 22 when running of the front shutter is completed as in the case of the protruding section 5a explained in the above-described embodiment.

The role of the plurality of protruding sections 5a, 5c and 5d is basically the same as that of the protruding section 5a explained in the above-described embodiment and the addition of the protruding sections 5c and 5d makes it possible to effectively increase the penetration resistance of the front shutter even if the front shutter is pressed on the blade root side or blade end side away from the central area of the shutter aperture 1a. The penetration resistance at this time increases a little more than the above-described embodiment.

Furthermore, this embodiment does not extend the shape of the two-dot dashed line 5l of the #4 front blade 5 up to the position of the end 5b, but partially provides protruding sections 5a, 5c and 5d to thereby suppress an unnecessary increase of the blade inertia.

This embodiment also adopts a smooth shape for the protruding sections 5a, 5c and 5d and can thereby reduce operating resistance and prevent catching in a warped condition when a pressure is applied to the blade.

FIG. 14 to FIG. 22 show an image display apparatus provided with a shutter apparatus, which is another embodiment of the present invention and suitable for a photo stand and electronic album, etc.

This image display apparatus allows the user to enjoy a negative film by optically projecting a negative image onto the display screen and using a spatial light modulator (hereinafter referred to as "SLM") capable of inverting the negative image as a screen.

Especially using a ferroelectric liquid crystal (hereinafter referred to as "FLC") as the SLM liquid crystal, this image display apparatus writes the negative image to the SLM instantaneously using a strobe used for a camera, etc. taking advantage of a memory feature of the FLC and observes the image by means of reading light.

Figure 14:
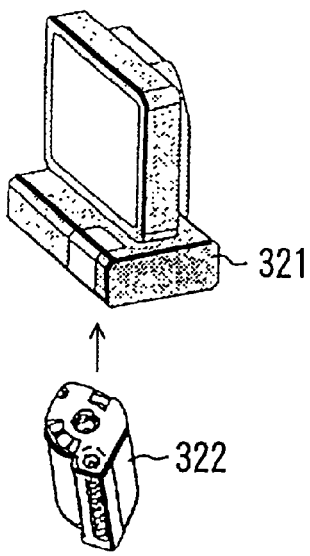
FIG. 14 is a conceptual drawing of an image display apparatus provided with a shutter apparatus, which is another embodiment of the present invention.

FIG. 14 shows an image of an image display apparatus 321 in use, which when loaded with a developed IX240 film (hereinafter referred to as "film cartridge 322") as the negative film, inverts the negative image to a positive image and displays a high-definition image.

Figure 15:
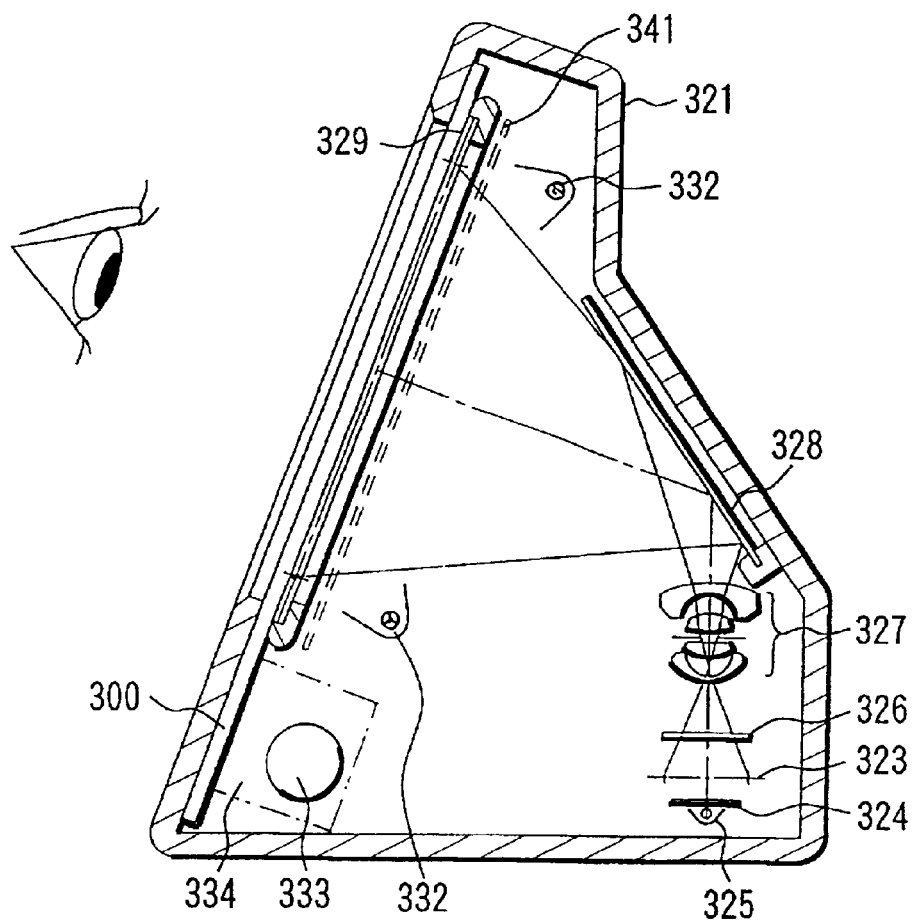
FIG. 15 is a cross-sectional view of the image display apparatus.

FIG. 15 shows a cross-sectional view of the image display apparatus 321. In FIG. 15, reference numeral 323 denotes a developed negative film which contains photographed images extracted from the film cartridge 322 and is constructed in such a way that the film is sent to the writing position shown in the figure frame by frame through a film winding mechanism (not shown).

Reference numeral 324 denotes a milk-white diffusion plate, which is constructed so as to uniformly diffuse light emitted from a strobe apparatus 325, which will be described later, to illuminate the negative film 323.

Reference numeral 325 denotes a strobe lighting apparatus used for a camera, etc., which is constructed of an Xe tube, a reflector and light-emitting circuit, etc. This strobe lighting apparatus 325 emits light by a trigger signal from a light-emitting circuit, which will be described later.

Reference numeral 326 denotes an orange elimination filter which plays the role of eliminating a orange-based color from the negative image and is constructed of an optical filter of a blue color which is a complementary color of orange.

Reference numeral 327 denotes projection lenses which project the negative image of the negative film 323 at a predetermined magnification through a reflection mirror 328 onto a photoelectric conversion layer of an SLM 329, which will be described later.

Reference numeral 329 denotes an SLM, the configuration of which will be explained using FIG. 16(A) and 16(B). FIG. 16(A) and FIG. 16(B) show a state of the SLM 329 during an image writing and during an image observation, respectively.

Reference numeral 329a denotes a pure color or complementary color filter, which is a fine filter used for image-taking element such as CCD or CMOS used for a video camera, etc. making it possible to observe a silver image without deterioration and is therefore desirable as this image display apparatus.

Reference numerals 329b and 329h denote polarizing plates between which a liquid crystal layer, which will be described later, is inserted and in the configuration shown in FIG. 16, the polarizing direction of 329b is normal to the plane of the paper of FIG. 6(A) and 6(B), and the polarizing direction of 329h is horizontal to the plane of the paper, that is, a so-called cross-Nicol configuration.

Reference numerals 329c and 329f denote transparent conductive membrane (hereinafter referred to as "ITO membrane") normally constructed of indium oxide, etc. and an AC power supply 330 and an SLM control circuit, which drives it and will be described later, apply potentials of different polarities to the ITO membrane 329c and 329f when a SW 331 turns ON.

Reference numeral 329d denotes a photoconductive layer, which is formed of a photodiode layer made up of an amorphous membrane or OPC (organic semiconductor membrane), etc. and its one side has absolute contact with the ITO membrane 329c and the other side has absolute contact with an FLC 329e, which will be described later.

Reference numeral 329e denotes an FLC, which is a liquid crystal layer, and one side thereof has an absolute contact with photoconductive layer 329d and the other side thereof has an absolute contact with the aforementioned ITO membrane 329f.

Reference numeral 329g denotes glass, which has a role of sealing the liquid crystal layer and at the same time protecting other layers.

Reference numeral 329j denotes a negative film image to illustrate a virtual image of pixels of the negative film 323 projected by the aforementioned projection lenses 327.

In FIG. 15, reference numeral 332 denotes a straight tube type read lighting apparatus often used for a flat display, etc. and reference numeral 300 denotes a shutter apparatus placed in front of the SLM 329.

Figure 17:
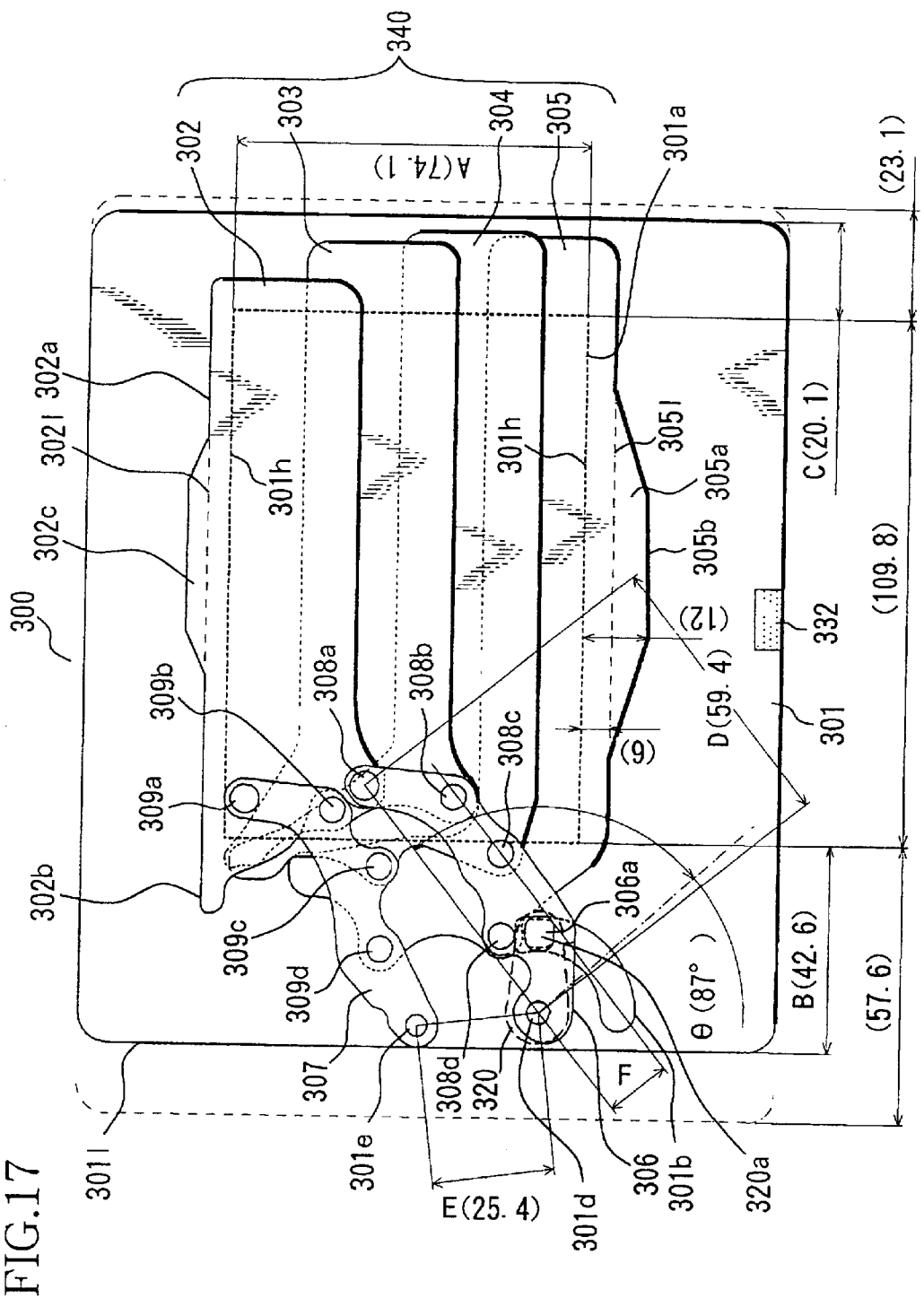
FIG. 17 is a front view showing the shutter apparatus in FIG. 14 when external light incident upon an SLM screen is shut off.
Figure 18:
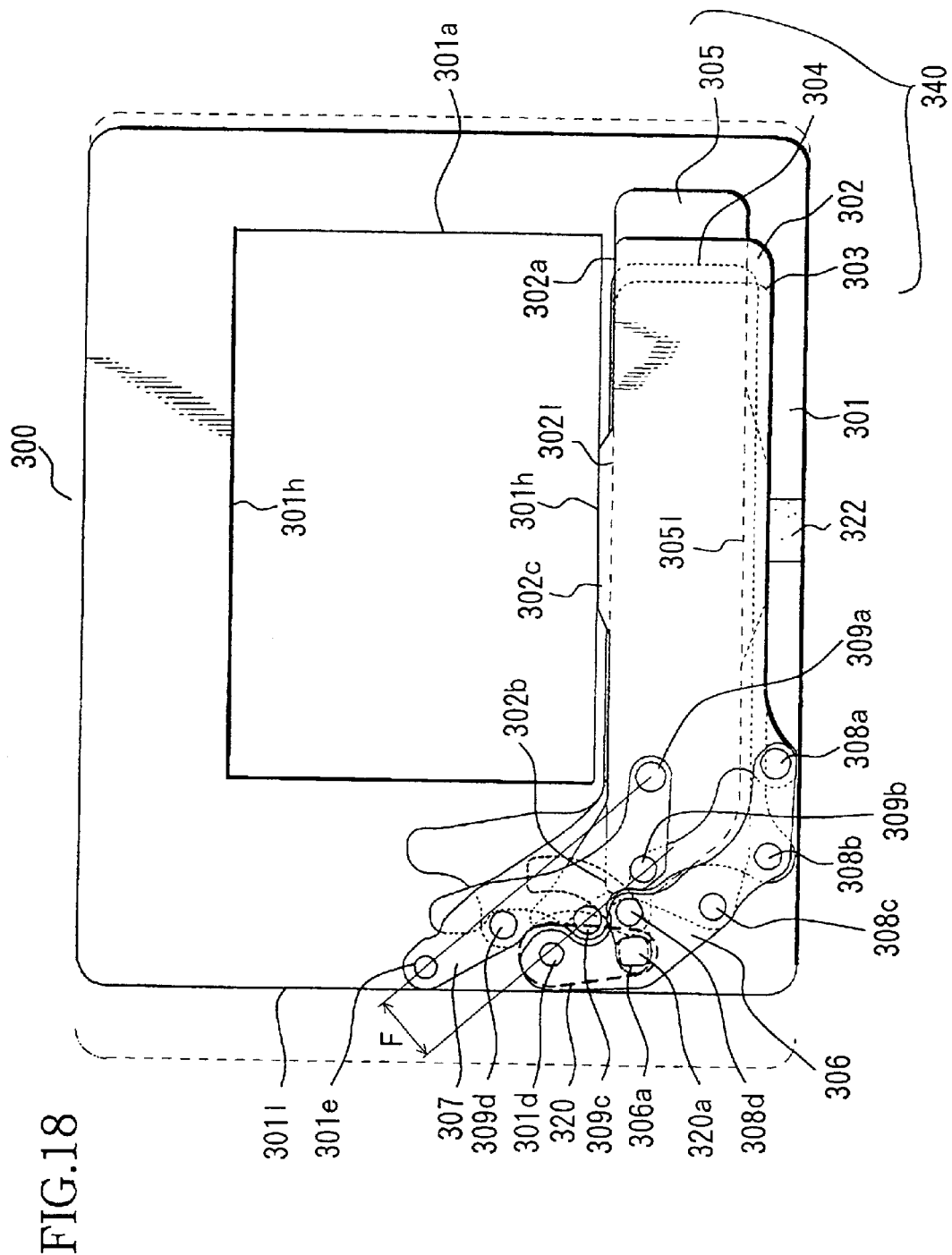
FIG. 18 is a front view showing the shutter apparatus in FIG. 14 when the SLM screen is opened.

FIG. 17 and FIG. 18 show a shutter apparatus 300. FIG. 17 shows a shutter spread (closed) state in which external light incident upon the screen of the SLM 329 is shut off. FIG. 18 shows a shutter supreposed (open) state in which the screen of the SLM 329 is opened to allow the user to observe the displayed image.

In these drawings, reference numeral 301 denotes a board having a shutter aperture 301a (hereinafter referred to as "shutter base plate"); 320, a drive lever that gives transfer energy to the blade unit; 301b, a long hole part to escape from a movement trail of the drive pin 320a of the drive lever 320.

Reference numeral 302 denotes a first blade (slit-forming blade); 302a, a slit-forming section of the first blade 302, which extends in the longitudinal direction; 302b, the end of the slit-forming section 301a on the arm base end side; 302c, a protruding section provided on the top end in the substantially center in the longitudinal direction (direction substantially orthogonal to the blade running direction) of the first blade 302.

This protruding section 302c is formed in such a way that the amount of protrusion is largest near the substantially center in the blade longitudinal direction of the first blade 302 and decreases toward both ends.

If the only function of the first blade 302 is to shield light, a rectilinear shape along the top end of the shutter aperture 301a as indicated by two-dot dashed line 302l in the figure is sufficient.

However, this embodiment provides the protruding section 302c supported overlapped with the upper part of the peripheral section of the shutter aperture of the shutter base plate 301 so as to increase penetration resistance of the blades, which will be described later.

Reference numeral 303 denotes a second blade; 304, a third blade; 305, a fourth blade. Reference numeral 305a denotes a protruding section provided at the bottom in the substantially center in the longitudinal direction (direction substantially orthogonal to the blade running direction) of the fourth blade 305.

This protruding section 305a is formed in such a way that the amount of protrusion is largest near the substantially center in the longitudinal direction of the fourth blade 305 and the amount of protrusion decreases toward both ends.

If the only function of the fourth blade 305 is to shield light, a rectilinear shape along the bottom of the shutter aperture 301a as indicated by two-dot dashed line 305l in the figure is sufficient.

However, this embodiment provides the protruding section 305a supported overlapped with the lower part of the peripheral section of the shutter aperture of the shutter base plate 301 so as to increase penetration resistance of the blades, which will be described later.

Reference numeral 305b denotes an end of the fourth blade 305 that contacts a stopper rubber 322 when external light incident upon the screen of the SLM 329 is shut off (when the shutter is unfolded).

Reference numeral 306 denotes a first arm and a base end section 306b thereof is attached so as to be pivotable around an axis 301d provided on the shutter base plate 301. The first blade 302 is connected to the end of this first arm 306 pivotably by means of a swaging dowel pin 308a.

Furthermore, reference numeral 306a denotes a hole part to allow the drive pin 320a of the drive lever 320 to penetrate in the drive direction without backlash and power is transmitted from the drive lever 320 provided with the rotational axis concentric with the axis 301d to the first arm 306 through this hole part.

The power generated by the shutter motor 333 is transmitted to the drive lever 320 through a gear train 334 (indicated in a simplified manner by two-dot dashed line in FIG. 15).

Reference numeral 307 denotes a second arm and a base end 307b thereof is attached so as to be pivotable around an axis 301e provided on the shutter base plate 301. The first blade 302 is connected to the end of this second arm 307 pivotably by means of a swaging dowel pin 309a.

The first blade 302, the first arm 306 and second arm 307 form a parallel link in this way.

Reference numeral 322 denotes a stopper rubber, which is a buffering material to stop the blade group, which moves thereto at high speed when movement (running) of the blades is completed, speedily and without shock.

Likewise, the second blade 303, the third blade 304 and the fourth blade 305 are connected in an intermediate area between the first arm 306 and second arm 307 pivotably by means of their respective swaging dowel pins 308b, 309b, 308c, 309c, 308d and 309d, forming a parallel link. A blade unit 340, which is the light shielding means, is constructed in this way.

In the situation in which the screen of the SLM 329 shown in FIG. 18 is opened, the end 302b of the shielding edge section on the arm base end side is located inside the operating area of the drive pin 320a. However, the end 302b of the shielding edge section on the arm base end side moves out of the operating area of the drive pin 320a as the spreading operation for closing the shutter aperture 301a advances, and therefore the end 302b never interferes with the drive pin 320a of the drive lever 320.

Figure 19:
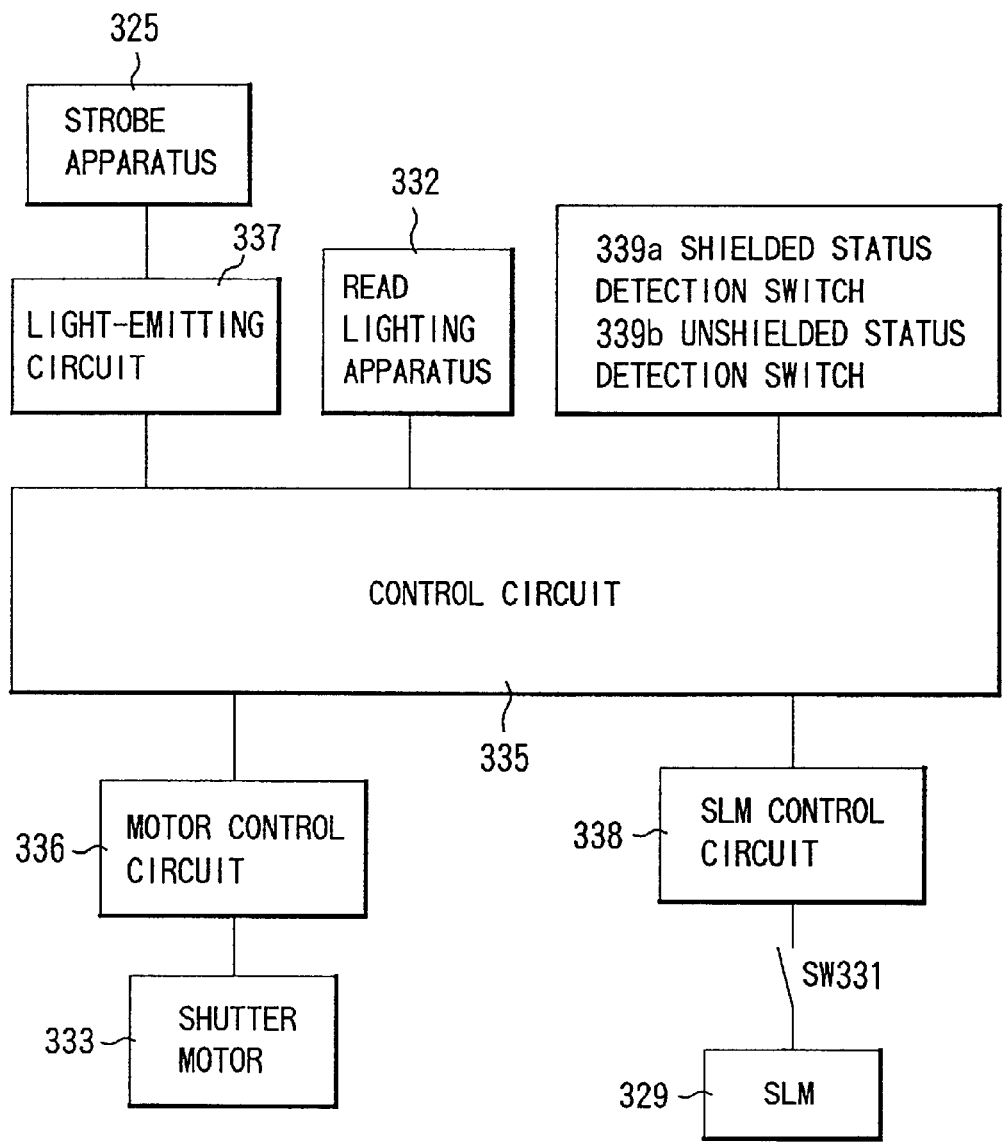
FIG. 19 is a block diagram showing a configuration of an electric circuit of the image display apparatus.
Figure 20:
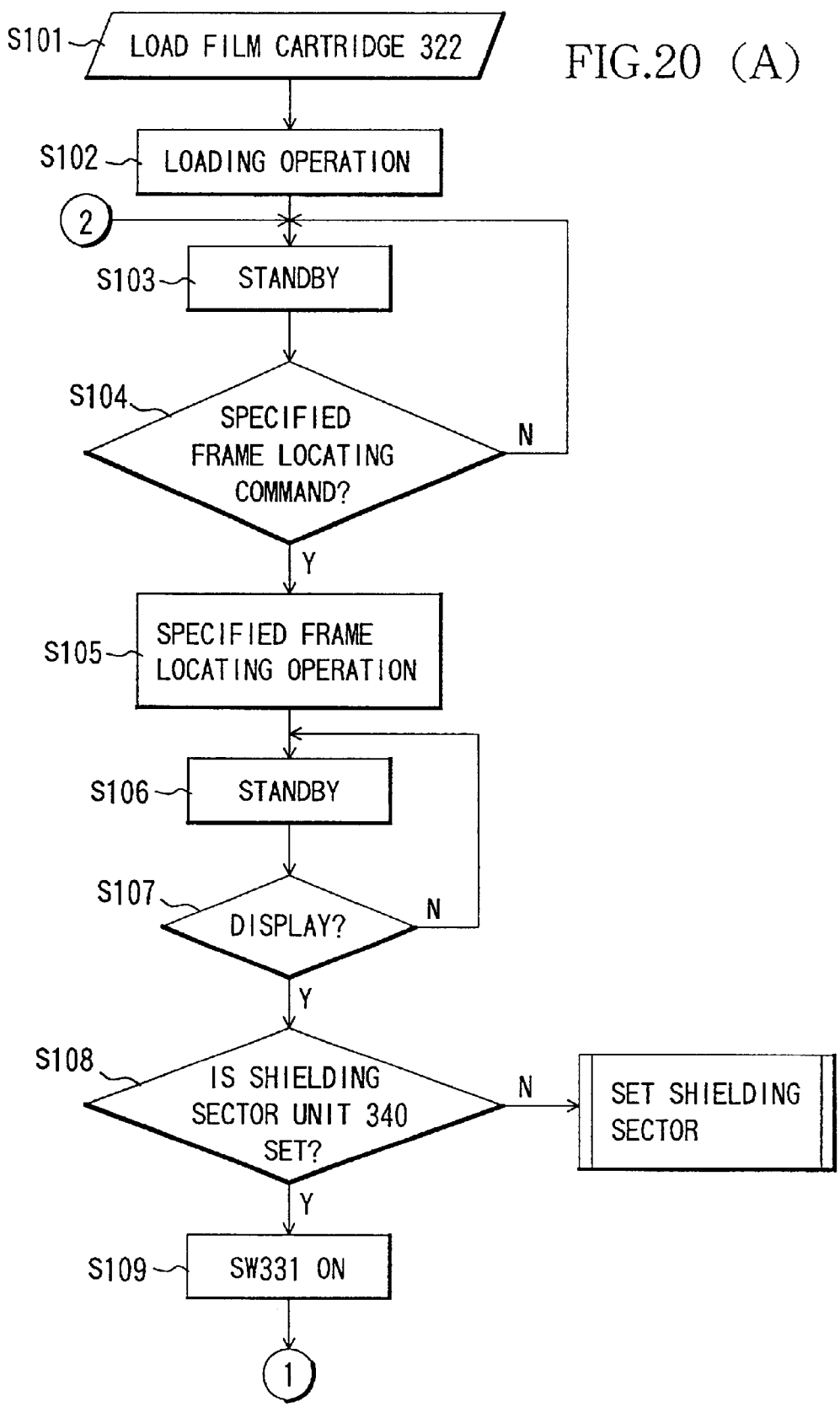
FIGS. 20(A) and 20(B) show a flow chart showing an operation of the image display apparatus.
Figure 20:
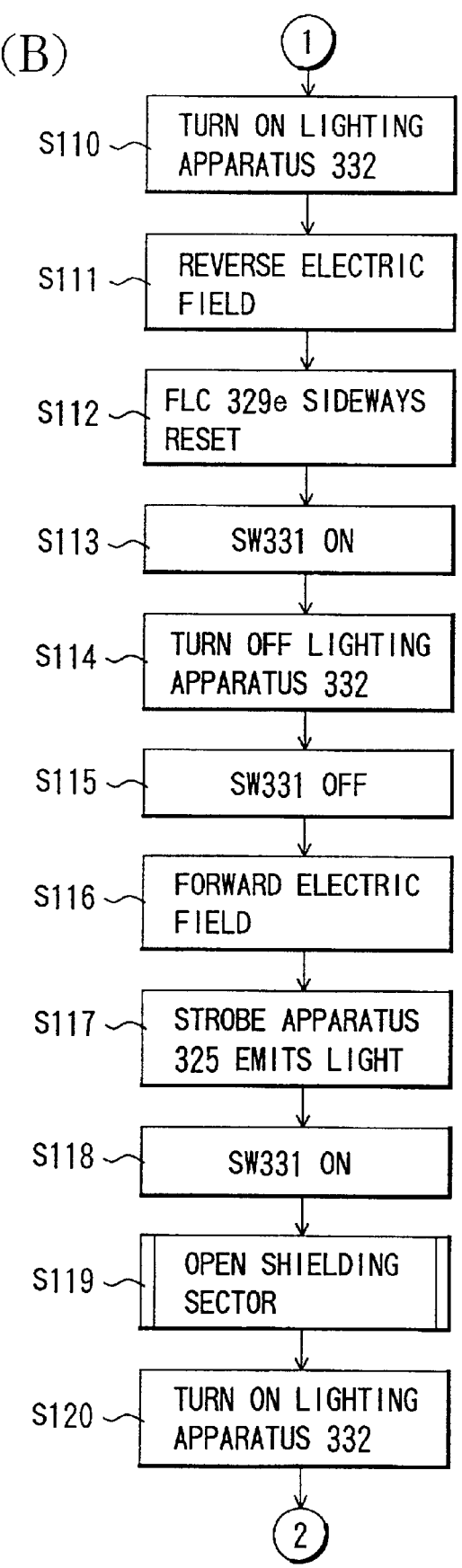

FIG. 19 shows an electric circuit configuration of the image display apparatus of this embodiment. In FIG. 19, reference numeral 335 denotes a control circuit that controls the overall sequence of the image display apparatus 321 and 336 denotes a motor control circuit that controls forward/backward rotation of the shutter motor 333.

Reference numeral 337 denotes a light-emitting circuit that control light emission of the strobe lighting apparatus 325 and 338 denotes an SLM control circuit that controls a SW 331 to switch ON/OFF of power to the SLM 329.

Furthermore, reference numeral 339a denotes a shielded state detection switch that turns ON when the blade unit 340 completely shields the shutter aperture 301a and 339b denotes a spread status detection switch that turns ON when the blade unit 340 completely unshields (opens) the shutter aperture 301a.

In FIG. 15, reference numeral 341 denotes a diffusion sheet that moves in connection with the opening/closing of the blade unit 340, which covers the back side (side of the plane of incidence of writing light) of the SLM 329 when the blade unit 340 is in an unshielded state, diffuses light from the read lighting apparatus 332 so as to illuminate the SLM 329 substantially uniformly. This makes it possible to display the image written in the SLM 329 without variations in brightness. The diffusion sheet 341 withdraws from the backside of the SLM 329 when the blade unit 340 covers the front of the SLM 329 to shield light and enables writing of the image to the SLM 329.

Then, an operation of the image display apparatus 321 will be explained using the flow chart shown in FIG. 20(A) and 20(B). Lines added the same circled numeral are connected to each other. The flow chart starts from the time at which the film cartridge 322 is loaded in the image display apparatus 321 and the blade unit 340 at this time is in a shielded(spread) state in which the blade unit 340 covers the shutter aperture 301a of the image display apparatus 321, that is, the user cannot observe the image of the SLM 329.

When the user loads the film cartridge 322 in the image display apparatus 321 to observe the film image in the film cartridge 322 using the image display apparatus 321 (S101), the control circuit 335 instructs the system to perform a thrust operation to send the negative film 323 in the film cartridge 322, position a first frame of the film 323 at the writing position of the image display apparatus 321 and stop (S102). In this state, the system is set in a standby mode waiting to receive a signal from each switch (not shown) (S103).

When a signal from a remote controller, etc. to specify a certain frame is input (S104), the control circuit 335 instructs the system to feed the specified frame to the writing position of the image display apparatus 321 (S105) and wait for a command to determine whether or not to display an image of this frame (S106).

Upon receipt of a display command from the user in this state (S107), the control circuit 335 decides whether the blade unit 340 is in a shielded state or not based on the output of the shielded state detection switch 339a. That is, the control circuit 335 checks whether the blade unit 340 is set in a shielded (spread) state or not so that the previously written image is erased and a new image is written with the shutter aperture 301a completely shielded (S108).

Here, in the case where the blade unit 340 does not completely shield the shutter aperture 301a, the process moves on to the "set shielding blade" subroutine, which will be described later.

When it is decided that the blade unit 340 shields the shutter aperture 301a completely, the SLM 329 turns ON the SW 331 to erase the previously written frame image (S109), then turns ON the read lighting apparatus 332 (S110) and applies an electric field opposite in direction to that during a write from the power supply 330 (S111).

Figure 16:
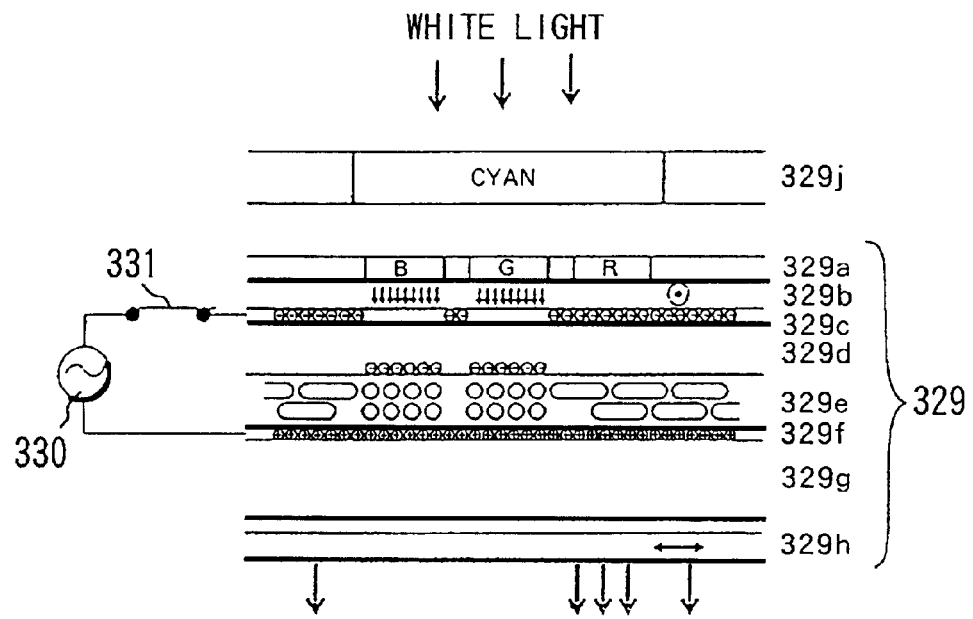
FIG. 16(A) and FIG. 16(B) illustrate the state of an SLM of the image display apparatus during an image write and image observation, respectively.
Figure 16:
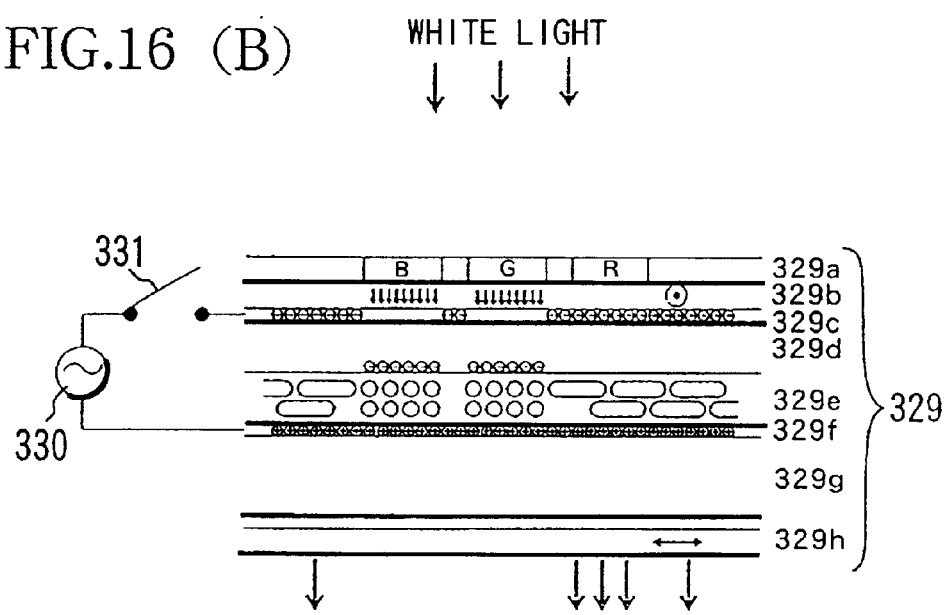

This causes all cells in the FLC 329e to be inverted to lie on their sides and become neutral as partially shown in FIG. 16 (S112). After the above-described reset operation is continued for a time enough for all cells to reach the above-described state, the SW 331 is turned OFF and the read lighting apparatus 332 is turned OFF (S113, S114).

Then, a new image writing operation flow starts. The current image display apparatus 321 is placed, for example, on a desk at an office or on a shelf on a wall in a house in the illumination of several hundreds of lux. This external light loses its intensity by about half when it passes through one polarizing plate 329h and liquid crystal layer 329e and enters the photoconductive layer 329d, but since the SW 331 is open in the actual state, no electric field applies between the ITO films 329c and 329f, and therefore the FLC 329e does not react.

Here, after the SW 331 is closed to turn ON power (S115), a forward electric field to write an image is applied to the ITO membranes 329c and 329f from the power supply 330 (S116). Then, the strobe apparatus 325 emits light (S117) and the image of the negative film 323 is projected through this strobe light to allow the SLM 329 to store the image.

All strobe light emission in S117 completes in approximately 500 μsec, and therefore turning-ON of the SW 331 in S116 takes place in almost the same time and at the same timing and turning OFF the SW331 immediately after the completion of light emission cuts the electric field (S118).

Then, the process moves on to a "open shielding blade" subroutine in which the blade unit 340 sets the shutter aperture 301a in an unshielded(superposed) state so that the user can observe the image written in the SLM 329 (S119). Then, this read lighting apparatus 332 is turned ON to allow the user to observe the written image through transmitted illumination (S120). Then, the image display apparatus 321 is placed in a standby status waiting to receive the next command (S103).

Figure 21:
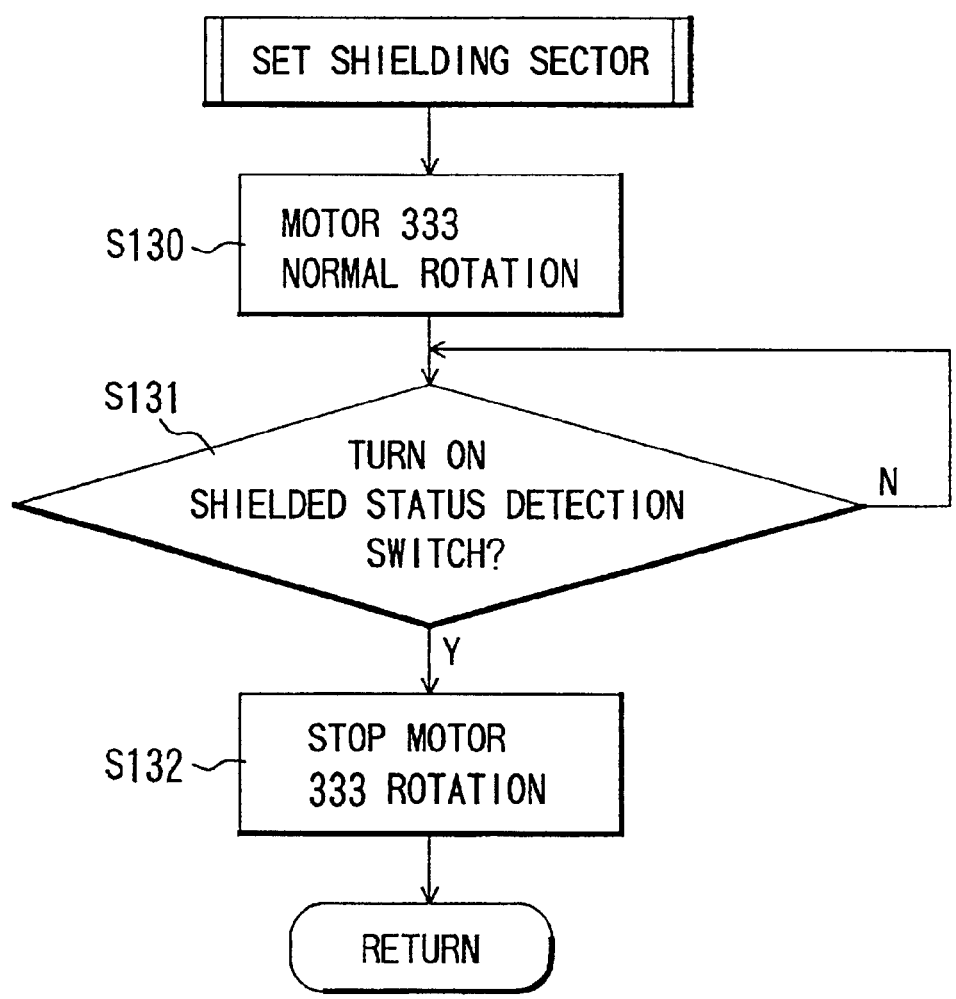
FIG. 21 is a flow chart of a "set shielding blade" subroutine of the image display apparatus.

Then, the "set shielding blade" subroutine will be explained using the flow chart shown in FIG. 21.

The control circuit 335 drives the shutter motor 333 to perform normal rotation so that the blade unit 340 completely shields the shutter aperture 301a (S130). The rotation of the shutter motor 333 is transmitted to the blade arm 306 through the gear train 334 and the blade arm 306 rotates counterclockwise around the axis 301d. This causes the blade unit 340 to move from the unshielded state in FIG. 18 to the shielded state in FIG. 17.

Then, the diffusion sheet 341 linked with the blade unit 340 withdraws from the state of covering the rear side of the SLM 329 to the state of uncovering to enable the image to be written to the SLM 329.

Thus, the shielded status detection switch 339a switches from OFF to ON almost simultaneously with the complete shielding of the shutter aperture 301a by the blade unit 340, which allows the control circuit 335 to decide that the shutter aperture 301a has been shielded completely (S131). Then, the control circuit 335 outputs a signal to the motor control circuit 336 to stop the motor, which causes the shutter motor 333 to stop rotation (S132). This subroutine completes at this point.

Figure 22:
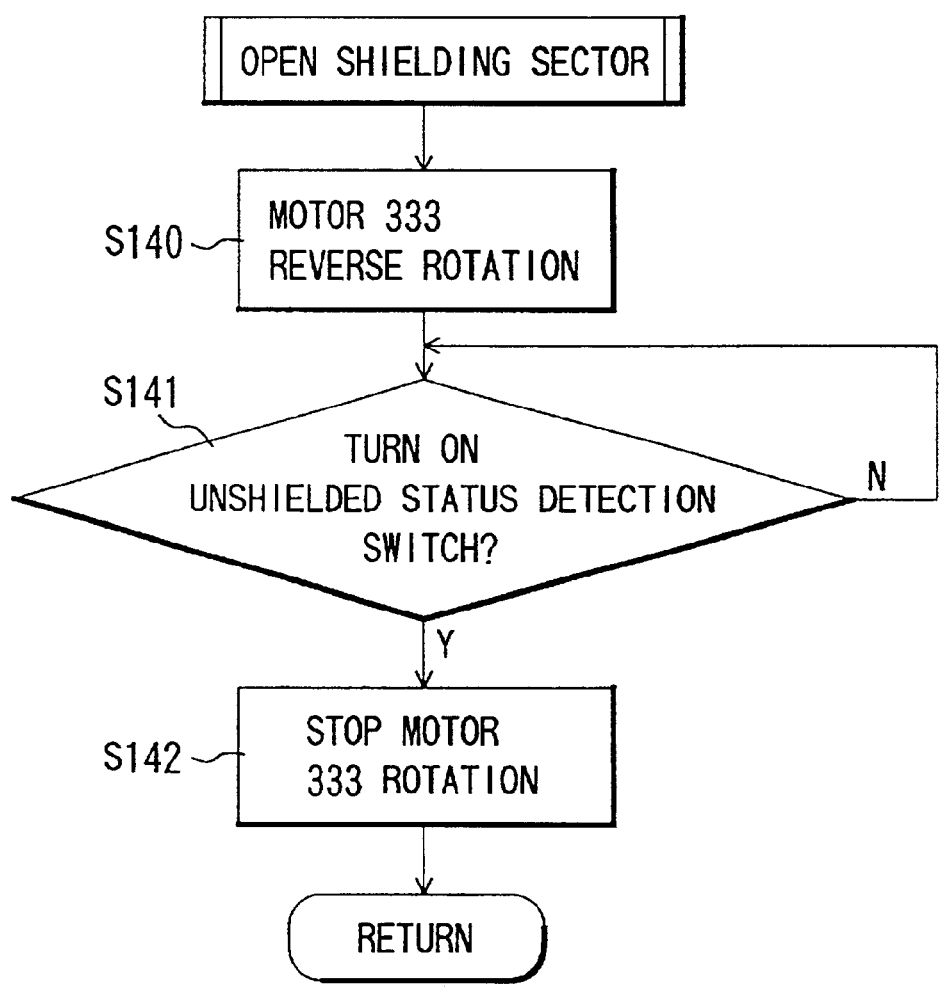
FIG. 22 is a flow chart of an "open shielding blade" subroutine of the image display apparatus.

Then, the "open shielding blade" subroutine will be explained using the flow chart in FIG. 22.

The control circuit 335 drives the shutter motor 333 to perform reverse rotation so that the blade unit 340 completely unshields the shutter aperture 301a (S140). The rotation of the shutter motor 333 is transmitted to the blade arm 306 through the gear train 334 and the blade arm 306 rotates clockwise around the axis 301d. This causes the blade unit 340 to change from the shielded state in FIG. 17 to the unshielded state in FIG. 18.

Then, the diffusion sheet 341 linked with the blade unit 340 changes from the withdrawn state behind the SLM 329 to the state of covering the back side of the SLM 329 and diffuses the light of the read lighting apparatus 332 so as to illuminate the SLM 329 generally uniformly.

Thus, the unshielded status detection switch 339b switches from OFF to ON almost simultaneously with the complete unshielding of the shutter aperture 301a by the blade unit 340, which allows the control circuit 335 to decide that the shutter aperture 301a has been unshielded completely (S141). Then, the control circuit 335 outputs a signal to the motor control circuit 336 to stop the motor, which causes the shutter motor 333 to stop rotation (S142). This subroutine completes at this point.

As described above, the blade unit 340 shields external light incident upon the SLM 329 during an image write, and can thereby eliminate noise of the image caused by influences of external light which would occur with the conventional image display apparatus which writes an image with the SLM 329 exposed to external light.

This eliminates the need for the conventional shutter apparatus to project a film image using a large amount of writing light from the strobe lighting apparatus 325 so as to display the image neatly and as a result can suppress an expansion in size of the strobe lighting apparatus 325 and miniaturize the image display apparatus 321. It also eliminates the need to make Fno. of the projection lens 327 clearer and allows the lens outer diameters of the projection optical system to be designed smaller and drastically reduces an image writing time.

The shutter apparatus 300 of this embodiment is mounted on an image display apparatus to observe the SLM 329 in a predetermined screen size (e.g., 75 mm in height, 111 mm in width) and, for example, the vertical size A of the shutter aperture 301a is set to 74.1 mm, the horizontal size is set to 109.8 mm. When the size of the shutter apparatus is reduced, the sizes of structures around the shutter aperture 301a are reduced.

Here, suppose the size from the end face of the shutter base aperture 301a on the arm base end side (left side in FIG. 17) to the end face of the shutter base plate 301 of the arm base end supporting side (left side in FIG. 17) is B, the size from the end face of the shutter aperture 301a on the blade end side (right side in FIG. 17) to the end face of the shutter base plate 301 of the blade end side (right side in FIG. 17) is C, the size from the rotational center of the arm base end to the rotational center of the swaging dowel pin 308a that connects the first blade 302 at the arm end is D, the maximum arm operating angle around the rotational center of the arm base end is θ and the size between the first and second arms of the parallel link formed of the first arm 306 and second arm 307 is E.

By the way, the outline of the shutter apparatus indicated by two-dot dashed line in FIG. 17 and FIG. 18 expresses the case where the conventional blade unit is used and this embodiment uses the same technology as that of the embodiments in FIG. 1 to FIG. 4, and therefore the horizontal size of the shutter apparatus is smaller than the conventional apparatus by 18mm.

On the other hand, since this embodiment makes it possible to increase the rotational angle of the arm of the blade unit 340 a great deal in a staggered configuration of the blade swaging dowel pins and allow the swaging dowel pins 308c, 309c, 308d, and 309d of the two blades (third blade and fourth blade) 304 and 305 placed near the arm base end to come closer to the end 301l in the horizontal direction of the outline of the shutter base plate 301 and to be placed along the end 301l in the horizontal direction in the superposed state of the blades, the distance in the horizontal direction between the blade swaging dowel pins 308c and 308d (and 309c and 309d) is 1.32 mm. Furthermore, considering that the angle corresponding to the overcharge is a maximum of 4°, it is possible to reduce these distances in the horizontal direction in an overlapped state to almost 0 mm. Thus, it is apparent that this embodiment has an extremely large effect of miniaturization of the size of the shutter apparatus in the direction orthogonal to the blade running direction (horizontal size).

The viewpoints on miniaturization of the shutter apparatus, arrangement of the blade connections on the arms (blade swaging dowel pins) and ratio in a specific dimensional relationship are also the same as those of the embodiments in FIG. 1 to FIG. 4 and the relational expressions (1) to (8) described in the embodiments in FIG. 1 to FIG. 4 also apply to this embodiment.

Moreover, as in the cases of the embodiments in FIG. 1 to FIG. 4, there are combinations appropriate (well-balance) among the respective dimensions; the key elements in the miniaturization are the D size and θ, interference between the blade connections is adjusted and parallelism of the slit-forming blades is maintained through the E size, and shielding performance such as adjustment of interference between the blade connections and maintenance of the amount of overlapping between the blades, etc. is secured through the arrangement of the blade connections on the arms. The B size and C size are the sizes derived from D, θ and E.

When the screen of the SLM 329 is shielded from external light, the blade group covers the shutter aperture 301a as shown in FIG. 17. Since the glass 329g is placed on the observation side of the SLM 329, adverse influences such as reflection are eliminated without providing additional protection glass to cover the front of the blade group to observe images of high image quality.

For this reason, there is a possibility that the observer will touch or press the blade group by mistake during image writing.

For example, when the center of the shutter aperture 301a is pressed with a finger, the second blade 303 of the blade group is directly pressed, then the third blade 304 overlapped below (shutter base plate 301 side) is pressed and the fourth blade 305 overlapped below is pressed. In this case, the first blade 302 is not pressed, contributing none to the resistance to the pressure.

At this time, it is the fourth blade 305 that holds on at the bottom. While the second blade 303 and third blade 304 are supported by the shutter aperture peripheral section of the shutter base plate 301, which is a rigid body at the root and end of the blade, the fourth blade 305 is supported not only at the root and end of the blade but also at the bottom by the shutter aperture peripheral section of the shutter base plate 301.

Therefore, the shape of the fourth blade 305 has a great influence on the magnitude of resistance to penetration of the shutter aperture 301a by the blades.

For example, when the thickness of all the second to fourth blades 303 to 305 is the same, as in the case of this embodiment where these second to fourth blades 303 to 305 are formed as indicated by two-dot dashed line 305l in FIG. 17 and in comparison with a maximum value of the penetration resistance when there is overlapping of approximately 6 mm from the shutter aperture edge with respect to the peripheral section of the shutter aperture of the shutter base plate 301, if there is overlapping of approximately 12 mm from the shutter aperture edge with respect to the peripheral section of the shutter aperture of the shutter base plate 301 provided with the protruding section 305a, the maximum value of the penetration resistance improves by as high as approximately 30%.

Furthermore, when the upper section in the center of the shutter aperture 301a is pressed with a finger, only the first blade 302 of the blade group is pressed directly and the second blade 303 to the fourth blade 305 overlapped below the first blade 302 are pressed in that order. In this case, the protruding section 302c provided for the first blade 302 is supported on the top of the peripheral section of the shutter aperture in the shutter base plate 301, and therefore the maximum value of the penetration resistance improves reliably.

If the protruding section 305a is not provided for the fourth blade 305 as in the case of this embodiment (that is, shaped as indicated by two-dot dashed line 305l), the blade widths of the first blade 302 and second blade 303 are large and the third blade 304 and fourth blade 305 are small in the shutter apparatus with a generally optimal balance, and therefore in the situation in which the screen of the SLM 329 shown in FIG. 18 is opened, the first blade 302 and second blade 303 contact the stopper rubber 22, while the third blade 304 and fourth blade 305 do not contact the stopper rubber 22.

Thus, when the protruding section 305a is provided at the bottom in the generally center in the blade longitudinal direction of the fourth blade 5 and the screen of the SLM 329 is opened, if the bottom 305b of the protruding section 305a is made to contact the stopper rubber 322, this embodiment can increase the blade penetration resistance and at the same time improve the buffering effect when movement of the blade is stopped.

Moreover, of the four blade group, the fourth blade 305 has the shortest moving distance when the blade unit 340 is moved, and therefore it is possible to suppress the increment rate of the blade inertia even if the protruding section 305a is provided. Of course, the blade penetration resistance can also be increased by expanding the shape of the fourth blade 305 indicated by two-dot dashed line 305l up to the position of the end 305b, but considering the effect, the increment of the blade inertia is large, which is more disadvantageous than the case of this embodiment where the protruding section 305a is provided only in the center of the blade longitudinal direction.

Furthermore, it is desirable to provide the protruding section 305a for the fourth blade 305 near the center in the direction substantially orthogonal to the blade running direction with respect to the shape of the shutter aperture 301a when the screen of the SLM 329 is shielded from external light.

This is because the resistance of the blade is a minimum when an oblong card-shaped blade such as the fourth blade 305 is placed over the three sides (both sides and lower hem) of the shutter aperture 301a and a pressing force is applied to the center of the upper section of the blade from the direction perpendicular to the plane of the blade, whereas the resistance increases when the blade supporting point (position) is closer to the pressing position or when support for large displacement can be secured.

It is also preferable to provide the protruding section 302c for the first blade 302 near the center in the direction generally orthogonal to the blade running direction with respect to the shape of the shutter aperture 301a likewise.

By the way, this embodiment adopts a smooth shape for the protruding sections 302c and 305a, and can thereby reduce operating resistance and prevent catching in a warped condition when a pressure is applied to the blade.

As described above, this embodiment provides the protruding section 302c for the first blade 302 and the protruding section 305a for the fourth blade 305, and can thereby effectively enhance blade penetration resistance without increasing the blade inertia unnecessarily.

In this way, it is possible to provide a shutter apparatus which is small in size, especially small in the direction orthogonal to the blade running direction, capable of securing an amount of overlapping among blades for light shielding, having small inertia of the blade unit 340, high operating efficiency and suitable for high-speed operation.

Furthermore, this embodiment can also provide a shutter with high reliability by decreasing the probability that the shutter blade will penetrate the shutter aperture 301a even if the user touches or presses the shutter blade group with his/her finger by mistake during image write.

Furthermore, if the drive speed is kept at the same level as the conventional one without applying the advantage of having small inertia of the blade unit to an improvement of the drive speed, the necessary shutter charge energy decreases, which allows the drive mechanism such as the shutter motor 333 and gear train 334 to be simplified or allows the shutter apparatus to be made thinner, making it possible to reduce the size of the image display apparatus.

Furthermore, as explained in the embodiment shown in FIG. 12 and FIG. 13, it is also possible to form a plurality of protruding sections not only near the center but also at both sides of the center in the direction substantially orthogonal to the blade running direction of the first blade 302 and fourth blade 305.

As shown above, according to the foregoing embodiments, even if an external force acts on a plurality of spread blades in the direction of the optical axis from the opposite side of the base plate, the protruding section formed on the blade located closest to the end in the blade running direction, the blade located closest to the base plate or the blade with the shortest moving distance between a superposed state and spread state is supported in contact with the base plate, which makes it possible to increase resistance of the shutter aperture to penetration by these blades due to the above-described external force.

Thus, even if the user presses the unfolded blades of the shutter apparatus incorporated in a camera or image display apparatus with his/her finger, etc. by mistake, the present invention can prevent the blades from penetrating the shutter aperture and prevent the camera, etc. from being inoperable.

Furthermore, providing the protruding section partially, for example, near the center in the direction substantially orthogonal to the blade running direction, of the blade or forming the above-described protruding section on the blade with the shortest moving distance between an superposed state and a spread state makes it possible to increase resistance to penetration by the blades effectively without increasing the blade inertia unnecessarily.

Then by applying the above-described invention to a shutter apparatus of a short arm type (that is, with an arm connected near the end of the arm base end side in the direction substantially orthogonal to the blade running direction of a plurality of blades) with a large arm rotation angle, it is possible to provide a shutter apparatus which is of a simple structure, capable of easily securing the shielding performance such as avoiding interference between the connections between the arm and blades and maintaining the amount of overlapping among the blades, having small operating resistance and inertia, suitable for high-speed operation and small in size (especially small in the direction orthogonal to the blade running direction).

While preferred embodiments have been described, it is to be understood that modification and variation of the present invention may be made without departing from the sprit or scope of the following claims.

What is claimed is:

1. A shutter apparatus comprising:
   a base plate which has an aperture formed therein;
   a plurality of blades which runs between a superposed state and a spread state for opening and closing said aperture; and
   two arms, each of the arms pivotably supported on said base plate, and each of the arms pivotably connected to said plurality of blades,
   wherein said two arms cause said plurality of blades to run between the superposed state and the spread state, and
   a protruding section is formed on at least one of said plurality of blades, said protruding section protrudes in the blade running direction so as to overlap with said base plate in the spread state, and the amount of protrusion of the protruding section changes in a direction orthogonal to the blade running direction.

2. The shutter apparatus according to claim 1, further comprising:
   a plurality of rear shutter blades which runs between a superposed state and a spread state for opening and closing said aperture,
   wherein said plurality of rear shutter blades starts to run from the superposed state to the spread state after said plurality of blades has started to run from the spread state to the superposed state.

3. The shutter apparatus according to claim 1, wherein said arms are connected to the vicinity of the ends which are on the base end sides of said arms, of said blades.

4. A shutter apparatus comprising:
   a base plate having an aperture formed therein;
   a plurality of blades which runs between a superposed state and a spread state for opening and closing said aperture; and
   two arms, each of the arms pivotably supported on said base plate and each of the arms pivotably connected to said plurality of blades,
   wherein said two arms cause said plurality of blades to run between the superposed state and the spread state, and
   a protruding section is formed on the blade which runs the shortest distance between the superposed state and the spread state out of said plurality of blades, said protruding section protrudes in the blade running direction so as to overlap with said base plate in the spread state, and the amount of protrusion of the protruding section changes in a direction orthogonal to the blade running direction.

5. The shutter apparatus according to claim 4 further comprising:
   a plurality of rear shutter blades which runs between a superposed state and a spread state for opening and closing said aperture,
   wherein said plurality of rear shutter blades starts to run from the superposed state to the spread state after said plurality of blades has started to run from the spread state to the superposed state.

6. The shutter apparatus according to claim 4, wherein said arms are connected to the vicinity of the ends which are on the base end side of said arms, of said blades.

7. A shutter apparatus comprising:
   a base plate having an aperture formed therein;
   a plurality of blades which runs between a superposed state and a spread state for opening and closing said aperture; and
   two arms, each of the arms pivotably supported on said base plate, and each of the arms pivotably connected to said plurality of blades,
   wherein said two arms cause said plurality of blades to run between the superposed state and the spread state, and
   a plurality of protruding sections are formed on at least one of said plurality of blades, each of said protruding sections protrudes in the blade running direction so as to overlap with said base plate in the spread state.

8. The shutter apparatus according to claim 7, further comprising:
   a plurality of rear shutter blades which runs between a superposed state and a spread state for opening and closing said aperture,
   wherein said plurality of rear shutter blades starts to run from the superposed state to the spread state after said plurality of blades has started to run from the spread state to the superposed state.

9. The shutter apparatus according to claim 7, wherein said arms are connected to the vicinity of the ends which are on the base end side of said arms, of said blades.

10. A shutter apparatus comprising:
    a base plate having an aperture formed therein;
    a plurality of blades which runs between a superposed state and a spread state for opening and closing said aperture; and
    two arms, each of the arms pivotably supported on said base plate, and each of the arms pivotably connected to said plurality of blades,
    wherein said two arms cause said plurality of blades to run between the superposed state and the spread state, and
    a plurality of protruding sections are formed on the blade which runs the shortest distance between the superposed state and the spread state out of said plurality of blades, each of said protruding sections protrudes in the blade running direction so as to overlap with said base plate in the spread state.

11. The shutter apparatus according to claim 10, further comprising:
    a plurality of rear shutter blades which runs between a superposed state and a spread state for opening and closing said aperture,
    wherein said plurality of rear shutter blades starts to run from the superposed state to the spread state after said plurality of blades has started to run from the spread state to the superposed state.

12. The shutter apparatus according to claim 10, wherein said arms are connected to the vicinity of the ends which are on the base end side of said arms, of said blades.

13. A camera comprising:
    a base plate which has an aperture formed therein;
    a plurality of blades which runs between a superposed state and a spread state for opening and closing said aperture; and
    two arms, each of the arms pivotably supported on said base plate, and each of the arms pivotably connected to said plurality of blades,
    wherein said two arms cause said plurality of blades to run between the superposed state and the spread state, and
    a protruding section is formed on at least one of said plurality of blades, said protruding section protrudes in the blade running direction so as to overlap with said base plate in the spread state, and the amount of protrusion of the protruding section changes in a direction orthogonal to the blade running direction.

14. The camera according to claim 13, further comprising:
    a plurality of rear shutter blades which runs between a superposed state and a spread state for opening and closing said aperture,
    wherein said plurality of rear shutter blades starts to run from the superposed state to the spread state after said plurality of blades has started to run from the spread state to the superposed state.

15. The camera according to claim 13, wherein said arms are connected to the vicinity of the ends which are on the base end sides of said arms, of said blades.

16. A camera comprising:
    a base plate having an aperture formed therein;
    a plurality of blades which runs between a superposed state and a spread state for opening and closing said aperture; and
    two arms, each of the arms pivotably supported on said base plate and each of the arms pivotably connected to said plurality of blades,
    wherein said two arms cause said plurality of blades to run between the superposed state and the spread state, and
    a protruding section is formed on the blade which runs the shortest distance between the superposed state and the spread state out of said plurality of blades, said protruding section protrudes in the blade running direction so as to overlap with said base plate in the spread state, and the amount of protrusion of the protruding section changes in a direction orthogonal to the blade running direction.

17. The camera according to claim 16 further comprising:
    a plurality of rear shutter blades which runs between a superposed state and a spread state for opening and closing said aperture,
    wherein said plurality of rear shutter blades starts to run from the superposed state to the spread state after said plurality of blades has started to run from the spread state to the superposed state.

18. The camera according to claim 16, wherein said arms are connected to the vicinity of the ends which are on the base end side of said arms, of said blades.

19. A camera comprising:
    a base plate having an aperture formed therein;
    a plurality of blades which runs between a superposed state and a spread state for opening and closing said aperture; and two arms, each of the arms pivotably supported on said base plate, and each of the arms pivotably connected to said plurality of blades, wherein said two arms cause said plurality of blades to run between the superposed state and the spread state, and a plurality of protruding sections are formed on at least one of said plurality of blades, each of said protruding sections protrudes in the blade running direction so as to overlap with said base plate in the spread state.

20. The camera according to claim 19, further comprising:

a plurality of rear shutter blades which runs between a superposed state and a spread state for opening and closing said aperture, wherein said plurality of rear shutter blades starts to run from the superposed state to the spread state after said plurality of blades has started to run from the spread state to the superposed state.

21. The camera according to claim 19, wherein said arms are connected to the vicinity of the ends which are on the base end side of said arms, of said blades.

22. A camera comprising:

a base plate having an aperture formed therein;

a plurality of blades which runs between a superposed state and a spread state for opening and closing said aperture; and two arms, each of the arms pivotably supported on said base plate, and each of the arms pivotably connected to said plurality of blades, wherein said two arms cause said plurality of blades to run between the superposed state and the spread state, and a plurality of protruding sections are formed on the blade which runs the shortest distance between the superposed state and the spread state out of said plurality of blades, each of said protruding sections protrudes in the blade running direction so as to overlap with said base plate in the spread state.

23. The camera according to claim 22, further comprising:

a plurality of rear shutter blades which runs between a superposed state and a spread state for opening and closing said aperture, wherein said plurality of rear shutter blades starts to run from the superposed state to the spread state after said plurality of blades has started to run from the spread state to the superposed state.

24. The camera according to claim 22, wherein said arms are connected to the vicinity of the ends which are on the base end side of said arms, of said blades.

* * * * *

UNITED STATES PATENT AND TRADEMARK OFFICE
CERTIFICATE OF CORRECTION

PATENT NO.    : 6,817,787 B2
DATED         : November 16, 2004
INVENTOR(S)   : Yasuhiro Toyoda It is certified that error appears in the above-identified patent and that said Letters Patent is hereby corrected as shown below:

Column 3,
Line 66, delete "approximately 2" and insert -- approximately 2mm --.

Signed and Sealed this

Seventh Day of March, 2006

JON W. DUDAS
*Director of the United States Patent and Trademark Office*